(12) United States Patent
Fukuzawa et al.

(10) Patent No.: US 7,279,248 B2
(45) Date of Patent: Oct. 9, 2007

(54) BIPOLAR BATTERY AND RELATED METHOD

(75) Inventors: Tatsuhiro Fukuzawa, Yokohama (JP); Kouichi Nemoto, Zushi (JP); Kenji Hosaka, Yokosuka (JP)

(73) Assignee: Nissan Motor Co., Ltd., Kanagawa-Ken (JP)

( * ) Notice: Subject to any disclaimer, the term of this patent is extended or adjusted under 35 U.S.C. 154(b) by 635 days.

(21) Appl. No.: 10/759,113

(22) Filed: Jan. 20, 2004

(65) Prior Publication Data

US 2004/0161667 A1 Aug. 19, 2004

(30) Foreign Application Priority Data

Feb. 18, 2003 (JP) ............... 2003-039766

(51) Int. Cl.
*H01M 10/04* (2006.01)
*H01M 2/14* (2006.01)
(52) U.S. Cl. ...................... 429/210; 429/185
(58) Field of Classification Search ............... 429/210, 429/185
See application file for complete search history.

(56) References Cited

U.S. PATENT DOCUMENTS

| | | |
|---|---|---|
| 5,141,828 A | 8/1992 | Bennion et al. |
| 5,232,797 A | 8/1993 | Moulton et al. |
| 5,729,891 A | 3/1998 | Richiardone et al. |
| 2003/0054244 A1 | 3/2003 | Fredriksson et al. |
| 2004/0091771 A1 | 5/2004 | Hosaka et al. |

FOREIGN PATENT DOCUMENTS

| | | |
|---|---|---|
| EP | 0 402 265 A1 | 12/1990 |
| EP | 0 726 610 A1 | 8/1996 |
| EP | 1 418 638 A2 | 5/2004 |
| JP | 59128776 A * | 7/1984 |
| JP | 08-007926 | 12/1996 |
| JP | 11-121025 | 4/1999 |
| JP | 11-204136 | 7/1999 |
| JP | P2000-100471 A | 4/2000 |
| JP | 2002-216846 | 8/2002 |
| WO | WO 03/026055 A1 | 3/2003 |

OTHER PUBLICATIONS

Linden et al. "Handbook of Batteries", McGraw Hill, Inc. 2nd Ed. 1995, pp. 36.13-36.16.*
European Search Report issued in corresponding European Patent Application No. EP 04 00 1005, dated Oct. 17, 2006.

* cited by examiner

*Primary Examiner*—Gregg Cantelmo
(74) *Attorney, Agent, or Firm*—McDermott Will & Emery LLP

(57) ABSTRACT

A bipolar battery comprises: a plurality of bipolar electrodes; electrolyte layers formed between adjacent ones of the plurality of bipolar electrodes, respectively; sealing portions surrounding and sealing the electrolyte layers, respectively; and contributing members contributing to keeping gaps between the adjacent ones of the plurality of bipolar electrodes, respectively. The contributing members are disposed within areas of the sealing portions, respectively.

16 Claims, 8 Drawing Sheets

FIG.8A
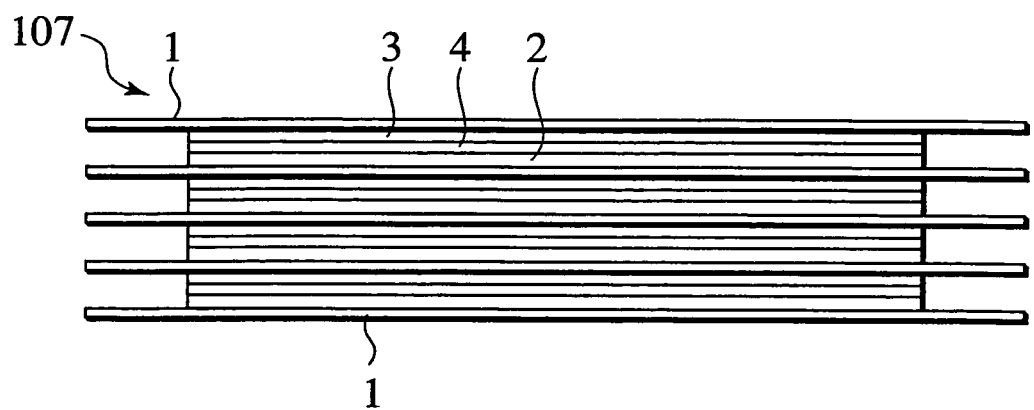
FIG.8B
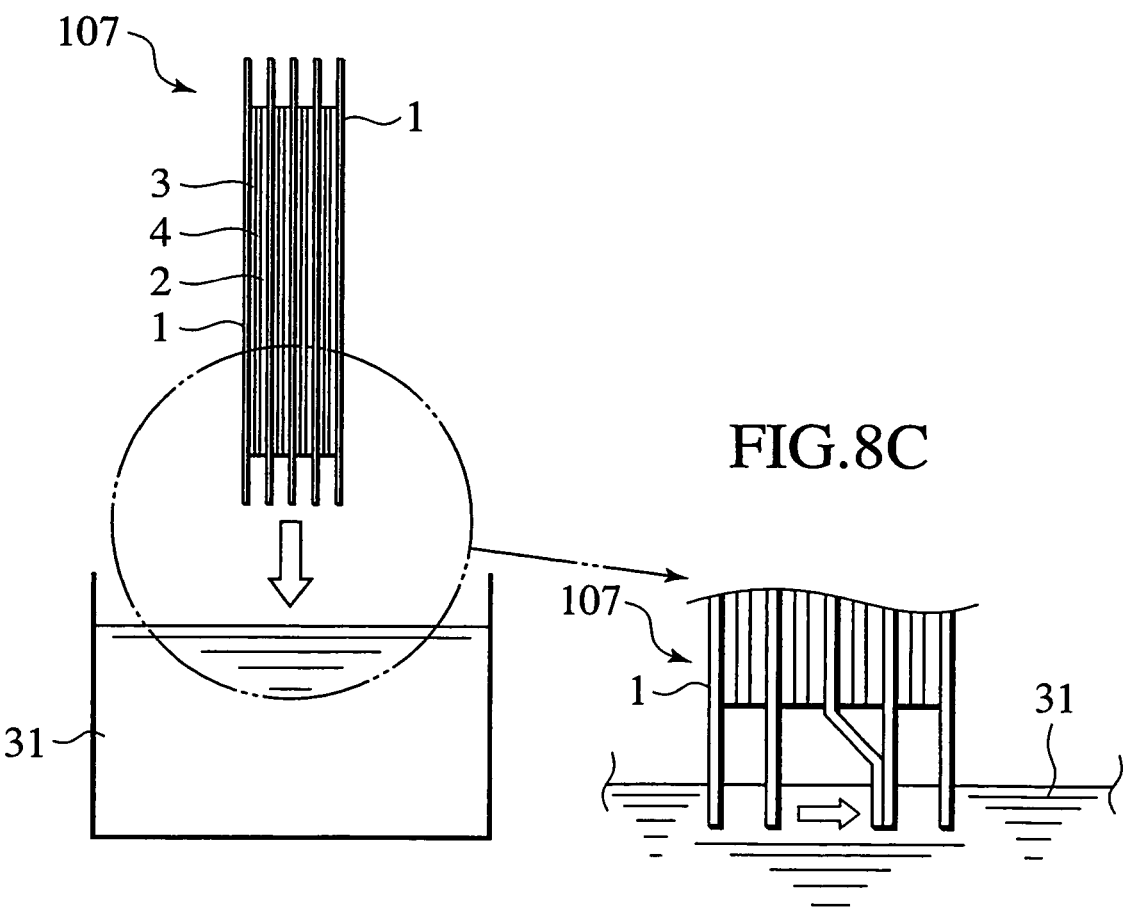
FIG.8C

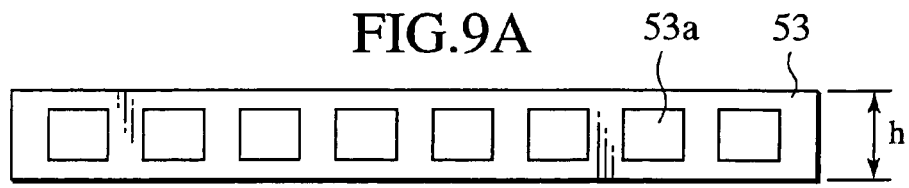
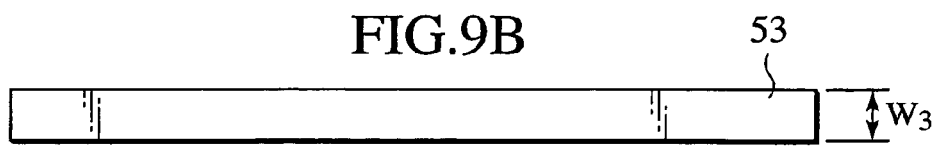
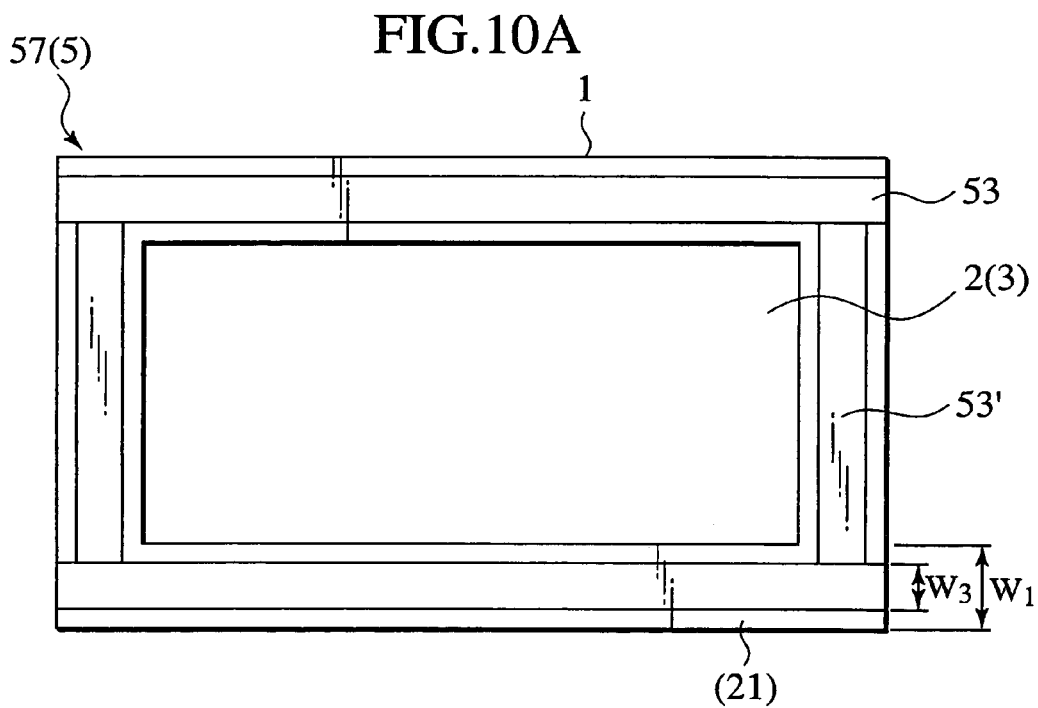
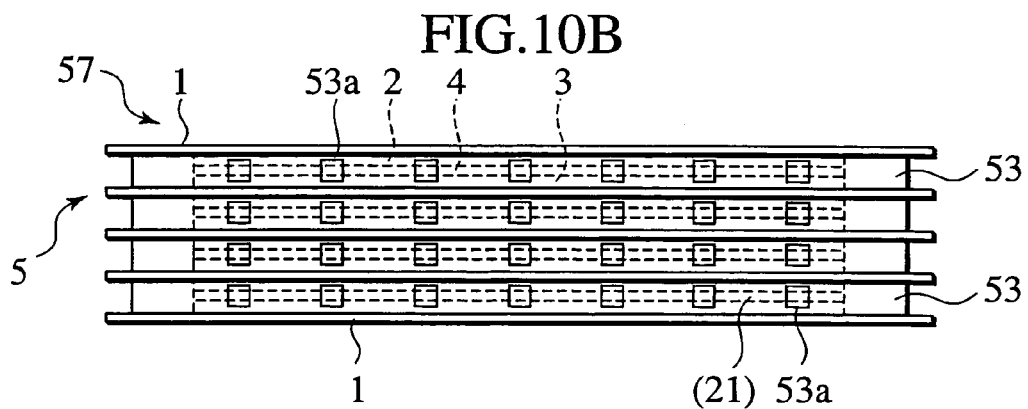

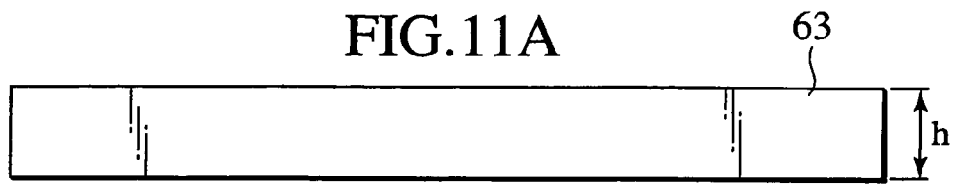
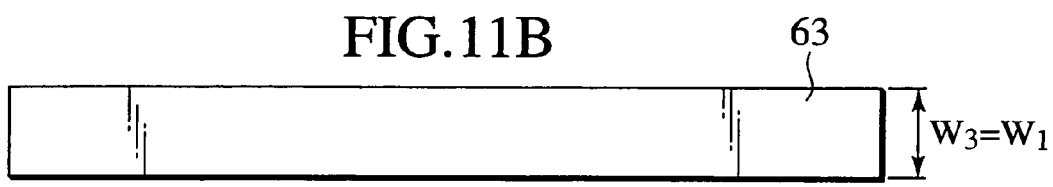
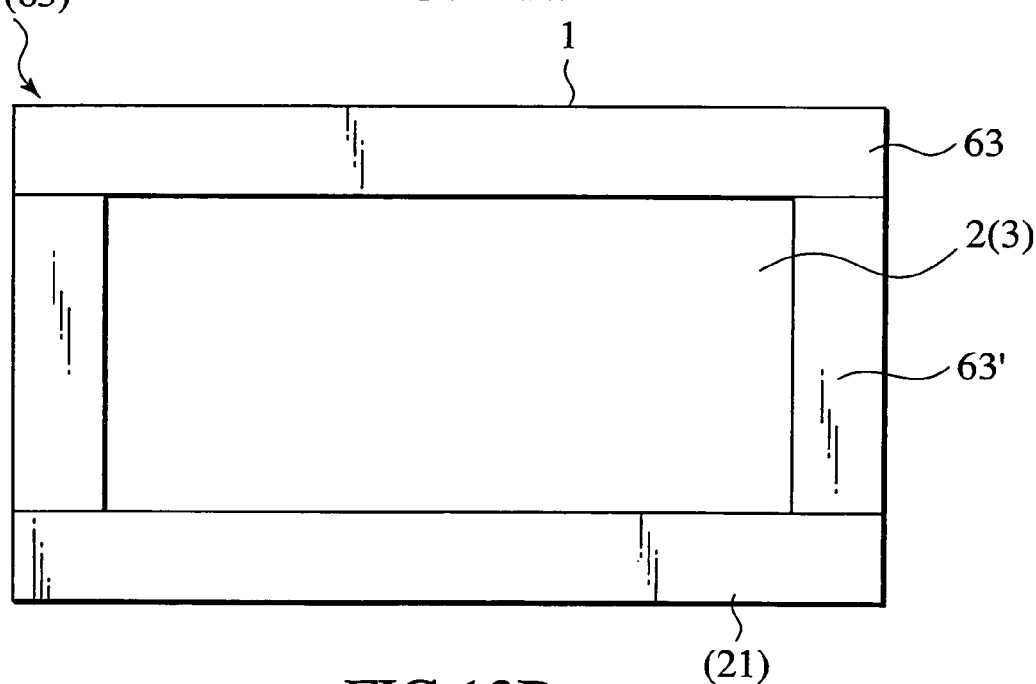
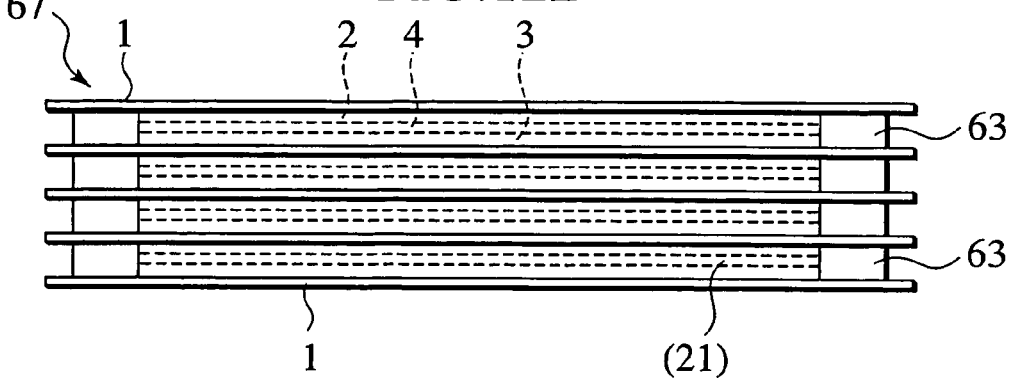

BIPOLAR BATTERY AND RELATED METHOD

BACKGROUND OF THE INVENTION

The present invention relates to a bipolar battery and a related method, and more particularly to a bipolar-battery and a related method utilizing polymer gel electrolyte having a higher ionic conductivity than polymer solid electrolyte.

It has been recently and earnestly desired to reduce exhausted amounts of carbon dioxide, for environmental-protection. In the vehicle industry, it has been expected to reduce exhausted amounts of carbon dioxide such as by introducing electric vehicles (EVs) and hybrid electric vehicles (HEVs), and there has been thus earnestly conducted development of secondary batteries for driving the motors of such vehicles, as decisive points for bringing these vehicles into practical use. Concerning secondary batteries, attention has been directed to so-called lithium-ion secondary batteries capable of achieving higher energy and higher output densities. Only, it is required to use series-connected multiple secondary batteries upon applying such secondary batteries to vehicles, so as to ensure larger outputs.

However, there is a tendency of lowered outputs in case of connecting the batteries via connecting portions, due to electrical resistance of the connecting portions. Further, batteries having connecting portions tend to exhibit deteriorated spatial efficiencies. Namely, the output densities, energy densities and the like of the batteries tend to be reduced due to the connecting portions.

In view of these circumstances, there have been developed bipolar batteries including current-collectors, each current-collector being provided with a positive-electrode-aimed active material (positive active material) and a negative-electrode-aimed active material (negative active material) at one and the other sides of the current-collector, respectively.

Japanese Patent Application Laid-open Publication No. 2000-100471 discloses a bipolar battery utilizing, as electrolyte, polymer solid electrolyte including no solution. This intends to provide a bipolar battery with a higher reliability and without anxieties of liquid leakage, gas generation and the like, by virtue of the absence of solution (electrolytic solution) in the battery. However, the polymer solid electrolyte has a lower ionic conductivity as compared with those electrolytes including separators impregnated with electrolytic solution, i.e., solution electrolytes, and compared with gel electrolytes, so that the polymer solid electrolyte has limitations in its output density, energy density and the like, thereby resulting in the present state waiting for a further improvement of ionic conductivity of polymer solid electrolyte so as to reach the practical stage.

Japanese Patent Application Laid-open Publication No. H11-204136 discloses a bipolar battery utilizing an electrolyte including electrolytic solution. This intends to provide the bipolar battery closest to the practical stage, because it is possible to obtain an improved ionic conductivity as well as a higher output density and a higher energy density of the battery, upon utilizing the electrolytic-solution-including electrolyte, particularly the gel electrolyte.

SUMMARY OF THE INVENTION

Based on the consideration of the present inventors, however, it is likely that the electrolytic solution oozes out of the electrolyte portion such as due to pressing to thereby cause a liquid junction (ionic short-circuit), in constituting a bipolar battery exemplarily utilizing, as electrolyte layers: separators impregnated with electrolytic solution; or the polymer gel electrolyte having a higher ratio of electrolytic solution.

Namely, in a bipolar battery including unit cell layers stacked and series-connected within the battery unlike a typical lithium-ion battery including electrodes stacked and parallel-connected within the battery, it is likely that the unit cell layers stacked within the bipolar battery are mechanically contacted with each other to thereby cause short-circuit or contacted with each other via electrolytic solution to thereby cause liquid junction.

It is then conceivable to form electrolyte sealing portions around the unit cells, respectively.

As a technique for forming such a sealing portion, it is conceivable to stack the electrodes and then to inject a resin into gaps around the electrodes.

However, since metal foils usable for current-collectors typically have thicknesses on the order of 10 to 20 $\mu$m and gaps on the order of 100 $\mu$m between the foils, it is likely that the foils are contacted with each other due to a pressure of a precursor of a resin having a higher viscosity, upon injecting the precursor into the gaps for forming the sealing portions.

The unit cells are electrically short-circuited when the foils contact with each other in this way, thereby requiring to additionally form sealing portions for avoiding such short-circuit, i.e., requiring to apply an electrical insulating treatment to the peripheries of the current-collector foils formed with the electrodes.

The present invention has been carried out based on such a consideration, and it is therefore an object of the present invention to provide a highly reliable bipolar battery including unit cells series-connected within the battery, capable of allowing to form electrolyte sealing portions while keeping the gaps between current-collector foils, thereby enabling the electrolyte sealing portions to electrically insulate the electrodes from each other, and to provide its related method.

To carry out such an object, in one aspect, the present invention provides a bipolar battery comprising: a plurality of bipolar electrodes; each of the plurality of bipolar electrodes being provided with: a current-collector; a positive electrode layer formed on one side of the current-collector; and a negative electrode layer formed on the other surface of the current-collector; electrolyte layers formed between adjacent ones of the plurality of bipolar electrodes, respectively, so that the plurality of bipolar electrodes are stacked in a stacking direction by interposing the electrolyte layers between adjacent ones of the plurality of bipolar electrodes, respectively; sealing portions surrounding and sealing the electrolyte layers, respectively; and contributing members contributing to keeping gaps between the adjacent ones of the plurality of bipolar electrodes, the contributing members being disposed within areas of the sealing portions, respectively.

In other words, in another aspect, the present invention provides a bipolar battery comprising: a plurality of bipolar electrodes; each of the plurality of bipolar electrodes being provided with: a current-collector; a positive electrode layer formed on one side of the current-collector; and a negative electrode layer formed on the other surface of the current-collector; electrolyte layers formed between adjacent ones of the plurality of bipolar electrodes, respectively, so that the plurality of bipolar electrodes are stacked in a stacking direction by interposing the electrolyte layers between adjacent ones of the plurality of bipolar electrodes, respectively; sealing means for surrounding and sealing the electrolyte layers; and contributing means for contributing to keeping gaps between the adjacent ones of the plurality of bipolar electrodes, the contributing means being provided in an area of the sealing means.

Meanwhile, in another aspect, the present invention provides a manufacturing method of a bipolar battery, comprising: preparing a plurality of bipolar electrodes, each of the plurality of bipolar electrodes being provided with: a current-collector; a positive electrode layer formed on one side of the current-collector; and a negative electrode layer formed on the other surface of the current-collector; providing electrolyte layers between adjacent ones of the plurality of bipolar electrodes, respectively; providing contributing members contributing to keeping gaps between the adjacent ones of the plurality of bipolar electrodes, respectively; stacking the plurality of bipolar electrodes in a stacking direction by interposing the electrolyte layers between adjacent ones of the plurality of bipolar electrodes, respectively; and forming sealing portions surrounding and sealing the electrolyte layers, respectively, the contributing members being disposed within areas of the sealing portions, respectively.

Other and further features, advantages, and benefits of the present invention will become more apparent from the following description taken in conjunction with the following drawings.

BRIEF DESCRIPTION OF THE DRAWINGS

FIG. 8A is a schematic side view of an electrode-stacked assembly using no spacers in a bipolar battery considered as a comparative example for the first embodiment;

FIG. 8B is a schematic view of the bipolar battery of the comparative example in a state just before the side portion of the electrode-stacked assembly is immersed into a resin (precursor) in a method for forming electrolyte sealing portions around the unit cell layers of the electrode-stacked assembly using no spacers;

FIG. 8C is a schematic view of the bipolar battery of the comparative example in a state where the unit cell layers are short-circuited after the side portion of the electrode-stacked assembly is immersed into the resin;

FIG. 9A is a schematic side view of a spacer to be used in a bipolar battery according to a second embodiment of the present invention;

FIG. 9B is a schematic plan view of the spacer of FIG. 9A;

FIG. 10A is a schematic plan view of an electrode-stacked assembly in the bipolar battery arranged with the multiple spacers shown in FIG. 9A and FIG. 9B (the current-collector at the top-most layer is omitted);

FIG. 10B is a schematic side view of the electrode-stacked assembly of FIG. 10A;

FIG. 11A is a schematic side view of a spacer to be used in a bipolar battery according to a third embodiment of the present invention;

FIG. 11B is a schematic plan view of the spacer of FIG. 11A;

FIG. 12A is a schematic plan view of an electrode-stacked assembly in the bipolar battery arranged with the multiple spacers shown in FIG. 11 (the current-collector at the top-most layer is omitted);

FIG. 12B is a schematic side view of the electrode-stacked assembly of FIG. 12A;

DETAILED DESCRIPTION OF THE PREFERRED EMBODIMENTS

There will be explained hereinafter bipolar batteries and related methods according to the embodiments of the present invention, with reference to the drawings in a suitable manner.

First Embodiment

There will be explained hereinafter a bipolar battery and a related method according to a first embodiment of the present invention, in detail.

Figure 1:
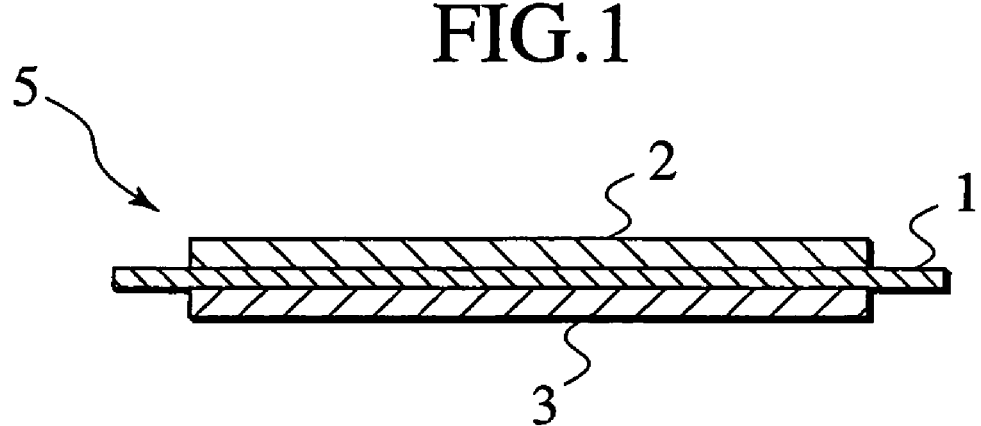
FIG. 1 is a schematic cross-sectional view of a basic structure of a bipolar electrode constituting a bipolar battery according to a first embodiment of the present invention.
Figure 2:
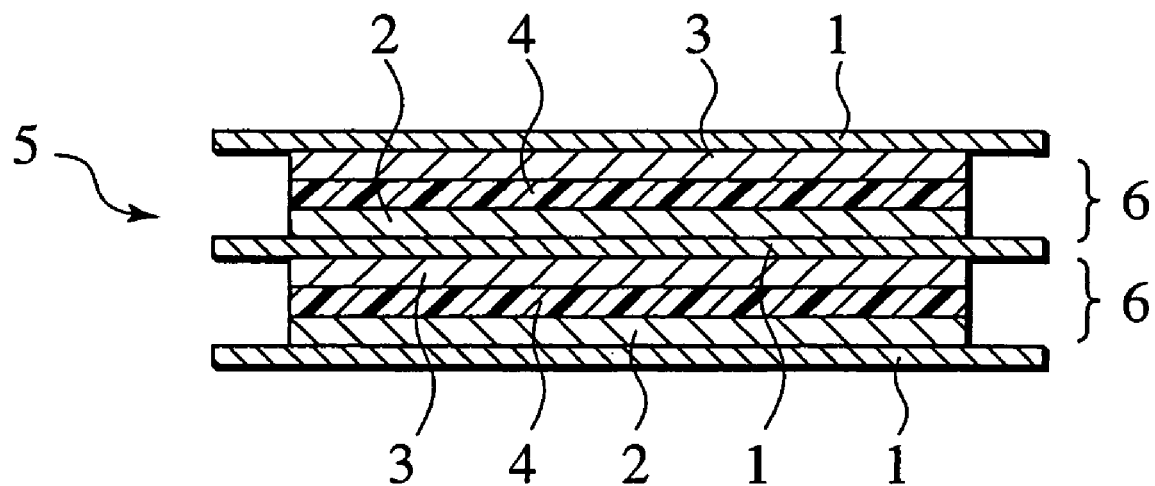
FIG. 2 is a schematic cross-sectional view of a basic structure of unit cell layers (unit cells) constituting the bipolar battery in the first embodiment.
Figure 3:
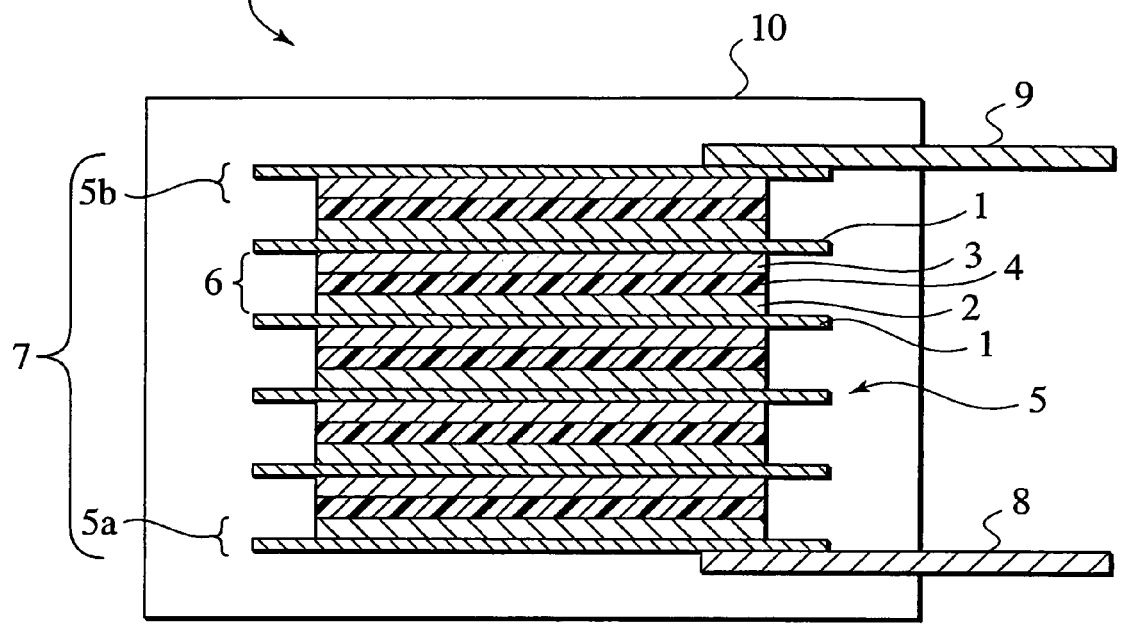
FIG. 3 is a schematic cross-sectional view of a basic structure of the bipolar battery in the first embodiment.
Figure 4:
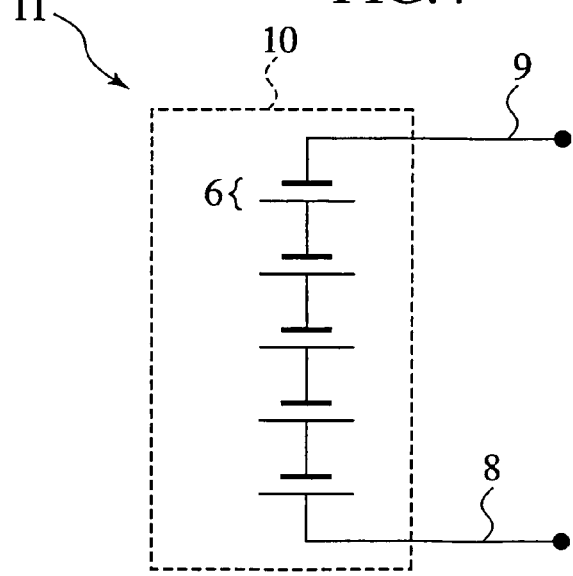
FIG. 4 is a schematic circuit diagram of the basic constitution of the bipolar battery in the first embodiment.
Figure 5A:
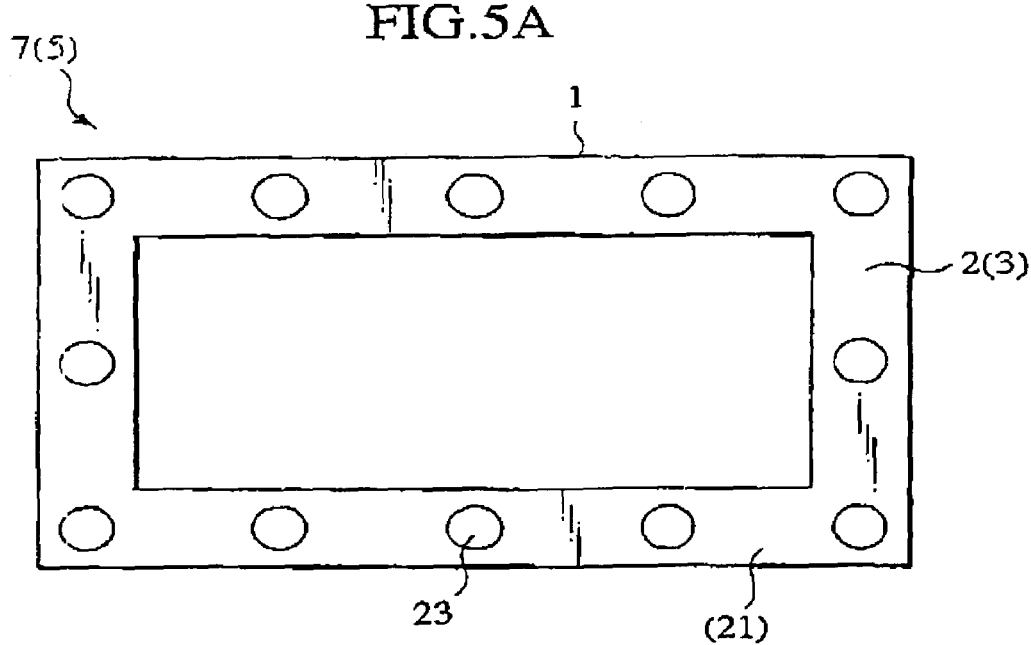
FIG. 5A is a schematic plan view of an electrode-stacked assembly arranged with multiple round-columnar spacers in the bipolar battery (the current-collector at the top-most layer is omitted) in the first embodiment.
Figure 5B:
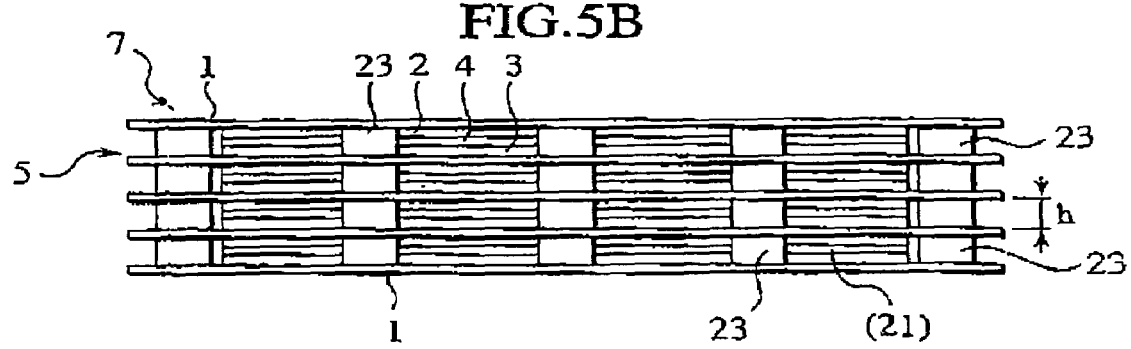
FIG. 5B is a schematic side view of the electrode-stacked assembly of FIG. 5A.

FIG. 1 is a schematic cross-sectional view of a basic structure of a bipolar electrode constituting a bipolar battery according to this embodiment; FIG. 2 is a schematic cross-sectional view of a basic structure of unit cell layers (unit cells) constituting the bipolar battery; FIG. 3 is a schematic cross-sectional view of a basic structure of the bipolar battery; and FIG. 4 is a schematic circuit diagram of the basic constitution of the bipolar battery, showing a constitution where the multiple unit cell layers stacked within the bipolar battery are series-connected. FIG. 5A is a schematic plan view of an electrode-stacked assembly arranged with multiple round-columnar spacers in the bipolar battery (the current-collector at the top-most layer is omitted); and FIG. 5B is a schematic side view of the electrode-stacked assembly of FIG. 5A.

FIG. 1 shows a bipolar electrode 5 constituted of a single sheet of current-collector 1, and a positive electrode layer 2 and a negative electrode layer 3 provided on one side and the other side of the current-collector 1, respectively.

As shown in FIG. 2, multiple bipolar electrodes 5 are stacked via electrolyte layers 4 such that a positive electrode layer 2 of one bipolar electrode is opposed to a negative electrode layer 3 of the adjacent bipolar electrode 5 via electrolyte layer 4. In such a stacked state, the components comprising the positive electrode layer 2, electrolyte layer 4 and negative electrode layer 3 including the associated pair of current-collectors 1 shall be called a "unit cell layer (unit cell)" 6, and each current-collector 1 of each unit cell layer 6 is shared by the applicable adjacent unit cell layer 6.

As shown in FIG. 3, such bipolar electrodes 5 are successively stacked to constitute a bipolar battery 11.

Namely, such a bipolar battery 11 comprises an electrode-stacked assembly (bipolar battery body) 7 of a structure including multiple bipolar electrodes 5 each including the positive electrode layer 2 and negative electrode layer 3 on one side and the other side, respectively, and stacked via electrolyte layers 4, respectively. Note, electrodes 5a, 5b at the top-most and bottom-most layers are provided not in bipolar electrode structures but in structures each simply formed with an electrode layer (positive electrode layer 2 or negative electrode layer 3) on the required one side of the applicable current-collector (terminal plate) 1. Further, the top-most and bottom-most current-collectors 1 are joined with corresponding positive and negative electrode leads 8, 9, respectively. The number of stacked bipolar electrodes 5 is appropriately determined, correspondingly to a desired voltage. For example, the number of stacked bipolar electrodes may be decreased, when a sufficient output can be ensured even by a decreased thickness of the sheet-like bipolar battery 11. Concerning the way to obtain the electrode-stacked assembly 7, it is possible to firstly prepare a required number of bipolar electrodes 5 each comprising the current-collector 1 formed with the positive electrode layer 2 and negative electrode layer 3 and then to successively stack these bipolar electrodes 5, or alternatively to successively stack the components beginning with the bottom-most current-collector 1.

Such a bipolar battery 11 is desirably structured so that the whole of the electrode-stacked assembly 7 is encapsulated (hermetically sealed) into a battery armoring material (armoring package) 10 under reduced pressure and the electrode leads 8, 9 are drawn out of the battery armoring material 10, so as to mitigate impacts from the exterior upon usage and to prevent environmental degradation. From a standpoint of a reduced weight, it is constitutionally desirable to adopt as the battery armoring material 10 a polymer-metal composite laminated film such as a laminate pack exemplarily including metal (inclusive of alloy) such as aluminum, stainless steel, nickel or copper coated with an electrical insulator like a polypropylene film, and to appropriately join a part or a whole of the periphery of the laminated film by heat sealing (heat welding) to thereby house and encapsulate the electrode-stacked assembly 7 within the battery armoring material 10 under reduced pressure while-drawing the electrode leads 8, 9 out of the battery armoring material 10.

Such a bipolar battery 11 is constituted to include multiple unit cell layers 6 stacked and series-connected as shown in FIG. 4.

Further, such a bipolar battery 11 is preferably applicable to a so-called bipolar-type lithium-ion secondary battery in which charge and discharge are mediated by migration of lithium ion. Only, the bipolar battery may be of course applied to other types of batteries, insofar as the equivalent battery characteristics can be obtained.

Incidentally, this embodiment includes electrolyte sealing portions positioned around the electrolyte layers and buried with spacers for keeping gaps between the electrodes, respectively.

In detail, there are provided spacers 23 within the electrolyte sealing portions 21 formed around the electrolyte layers 4, so as to keep the gaps between the bipolar electrodes 5, i.e., between the current-collectors 1, as shown in FIG. 5A and FIG. 5B. There will be thus mainly explained hereinafter the electrolyte sealing portions 21 and spacers 23.

Figure 6:
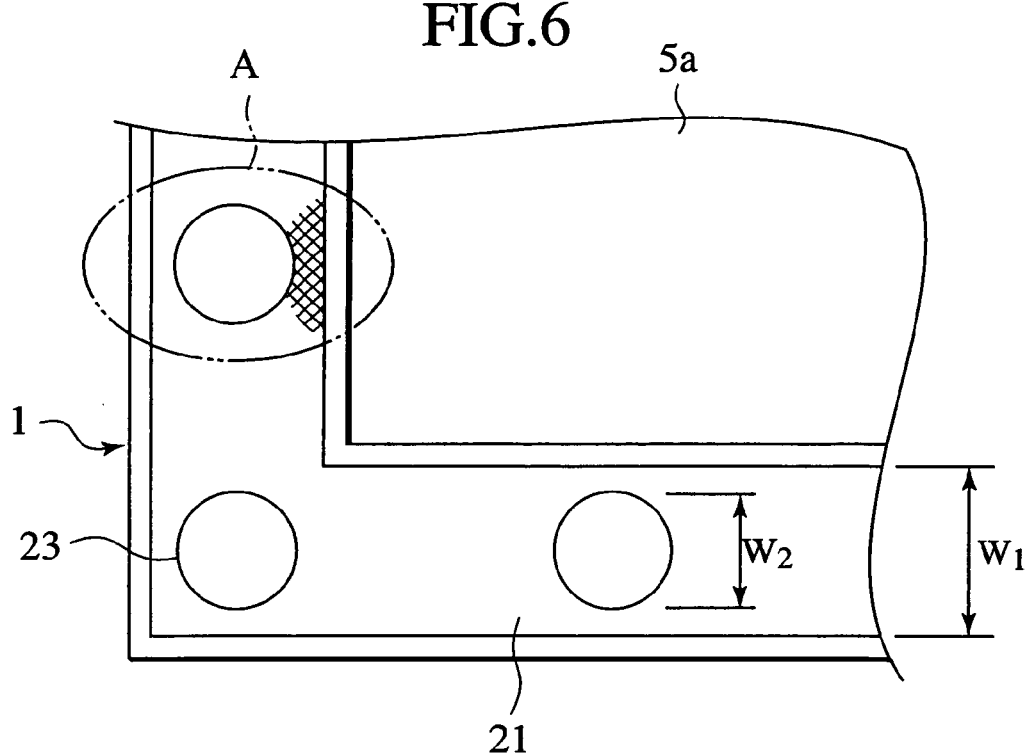
FIG. 6 is a schematic enlarged plan view of a corner portion of the electrode-stacked assembly in a state where electrolyte sealing portions are formed around the unit cell layers of the electrode-stacked assembly, respectively (the current-collector at the top-most layer is omitted) in the first embodiment.
Figure 7A:
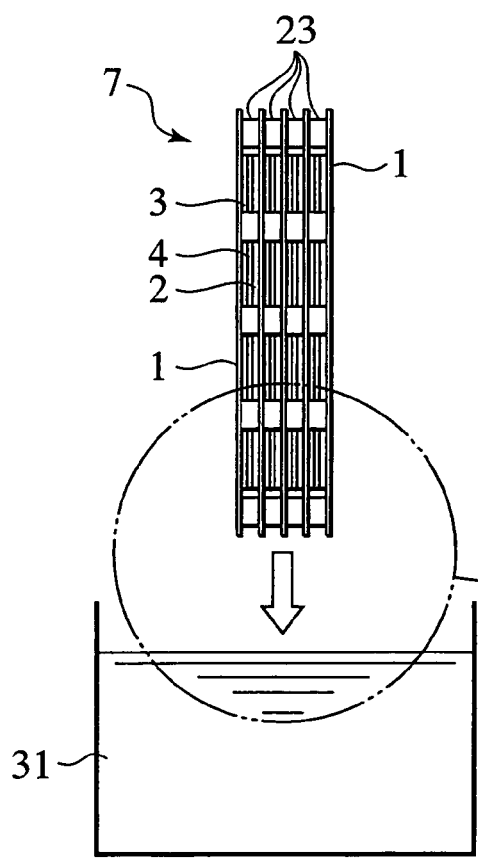
FIG. 7A is a schematic view of the bipolar battery in a state just before the side portion of the electrode-stacked assembly is immersed into a resin (precursor) in a method for forming electrolyte sealing portions around the unit cell layers of the electrode-stacked assembly utilizing the spacers, respectively, in the first embodiment.
Figure 7B:
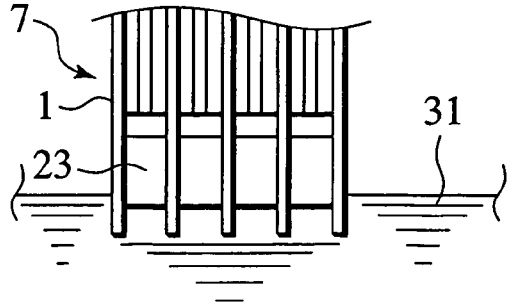
FIG. 7B is a schematic view of the bipolar battery in a state where the unit cell layers are kept in an electrically insulated condition by the spacers after the side portion of the electrode-stacked assembly is immersed into the resin in the first embodiment.

FIG. 6 is a schematic enlarged plan view of a corner portion of the electrode-stacking assembly in a state where electrolyte sealing portions are formed around the unit cell layers of the electrode-stacking assembly, respectively (the current-collector at the top-most layer is omitted); FIG. 7A is a schematic view of the bipolar battery of this embodiment in a state just before the side portion of the electrode-stacking assembly is immersed into a resin (precursor) in a method for forming electrolyte sealing portions around the unit cell layers of the electrode-stacking assembly utilizing the spacers, respectively; and FIG. 7B is a schematic view of the bipolar battery in a state where the unit cell layers are kept in an electrically insulated condition by the spacers after the side portion of the electrode-stacking assembly is immersed into the resin. FIG. 8A is a schematic side view of an electrode-stacking assembly using no spacers in a bipolar battery considered as a comparative example for this embodiment; FIG. 8B is a schematic view of the bipolar battery of the comparative example in a state just before the side portion of the electrode-stacking assembly is immersed into a resin (precursor) in a method for forming an electrolyte sealing portion around the unit cell layers of the electrode-stacking assembly using no spacers; and FIG. 8C is a schematic view of the bipolar battery of the comparative example in a state where the unit cell layers are short-circuited after the side portion of the electrode-stacking assembly is immersed into the resin.

Electrolyte Sealing Portion

The electrolyte sealing portions 21 (hereinafter also called "electrically insulative layers") are formed around the bipolar electrodes 5, for the purpose of avoiding occurrence of short-circuit such as due to contact between current-collectors 1, leakage of electrolytic solution, or slightly non-uniform end portions of the bipolar electrodes 5.

The electrolyte sealing portions 21 are buried with spacers 23 for keeping gaps between bipolar electrodes 5, i.e., between current-collectors 1, for the purpose of preventing the current-collectors 1 from mutually contacting to thereby cause short-circuit due to compression by a viscous sealing resin upon forming such electrolyte sealing portions 21.

In the bipolar battery 11 adopting solution electrolyte or polymer gel electrolyte as the electrolyte layers 4, each positive electrode layer 2 and each negative electrode layer 3 are formed at one surface and the opposite surface of the associated current-collector 1 by using one kind of positive electrode material and one kind of negative electrode material, respectively, to thereby form each bipolar electrode 5, and these bipolar electrodes 5 are stacked via electrolyte layers 4, respectively. It will be thus required to deal with a liquid junction due to a situation where the electrolytic solution contained in the solution electrolyte or polymer gel electrolyte of one unit cell layer 6 oozes out and contacts with the other unit cell layer.

It is thus required to form the electrolyte sealing portions 21 around the unit cell layers 6, respectively. In order to inject a resin into gaps around the electrode-stacked assembly 7 after stacking the bipolar electrodes 5 as a technique for forming such sealing portions from a standpoint for simplifying a manufacturing process, it has been tried to exemplarily prepare an electrode-stacked assembly 107 shown in FIG. 8A having no spacers, and to immerse the periphery of the electrode-stacked assembly 107 into a resin precursor 31 in an arrow direction shown in FIG. 8B.

However, it has been observed that the current-collectors 1 of the electrode-stacked assembly 107 occasionally contact with each other due to a pressure (compression) of the resin precursor 31 as represented by an arrow in FIG. 8C upon injecting the resin precursor 31 having a higher viscosity into the gaps, because each metal foil used for the current-collector 1 has a thickness on the order of 10 to 20 µm and the gap between adjacent current-collectors 1 is on the order of 100 µm. Such contact between peripheries of the current-collectors 1 causes electric short-circuit between unit cell layers 6. However, application of an electrical insulating treatment to the peripheries of the current-collectors 1 rather increases excessive structures.

There is thus adopted in this embodiment such a constitution that the spacers 23 are arranged around the current-collectors 1 upon stacking the bipolar electrodes 5, respectively, and thereafter the resin is injected into the gaps around the current-collectors 1.

Concretely, each bipolar electrode 5 includes the current-collector 1 formed with the positive electrode layer 2 on one side and the negative electrode layer 3 on the other side, as shown in FIG. 5A and FIG. 5B. Further, multiple spacers 23 are arranged on the peripheral portion of the bipolar electrode 5, i.e., on the area outside the coated regions of the positive electrode layer 2 and negative electrode layer 3 of the bipolar electrode 5.

Although the spacers 23 arranged at the peripheral portion of the bipolar electrode 5 are in the round-columnar shape herein, the shape thereof is not particularly limited insofar as the contact between bipolar electrodes 5 can be prevented. For example, it is of course possible to adopt: a polygonal columnar shape such as a triangular or rectangular shape in addition to the round-columnar shape, insofar as provided in a discontinuous body shape; an appropriate spherical or elliptical shape; a continuous body to be described later or another continuous body such as an unwoven fabric; or an appropriate combination thereof.

The size of spacers 23 to be arranged at the peripheral portions of the bipolar electrodes 5 is not particularly limited, insofar as capable of preventing contact between bipolar electrodes 5. For example, as represented by a region A in FIG. 6 in case of discontinuous bodies such as round-columnar shapes, it is desirable that the width $W_2$ (diameter, in this case) of each spacer 23 is made smaller than the width $W_1$ of the associated electrolyte sealing portion 21 so as to keep the size and intervals of the spacers 23 such that the resin precursor for forming the electrolyte sealing portion 21 is allowed to reach the area around the spacers 23, particularly up to the area (cross-hatched area in the region A) behind the spacer 23, in a manner that the spacers 23 are completely accommodated within the associated electrolyte sealing portions 21, i.e., the electrolyte sealing portions 21 are existent around the spacers 23, upon forming the electrolyte sealing portions 21.

Further, it is enough for the thickness (height) of each spacer 23 to be capable of preventing contact between bipolar electrodes 5 (current-collectors 1). In case of providing spacers 23 each having a height "h" corresponding to the gap between current-collectors 1 as shown in FIG. 5B, it is enough for the height "h" to be equivalent to the gap between paired adjacent current-collectors 1. It is of course possible to achieve one spacer by superposing (adhering) an upper spacer segment on a lower spacer segment. In case of such superposition, the thicknesses of the upper and lower spacer segments may be the same or different. Herein, the "height corresponding to the gap between the paired adjacent current-collectors 1" corresponds to the total thickness of the positive electrode layer 2, negative electrode layer 3 and electrolyte layer 4, and is occasionally called a "gap between bipolar electrodes 5". Further, it is possible to interpose an additional spacer segment between the upper and lower spacer segments, if required. Only, it is desirable to arrange the spacers 23 each having a height corresponding to the gap between the bipolar electrodes 5, i.e., the gap between the adjacent current-collectors 1 without any superposition, such as from a standpoint of a reduced number of spacer members and a simplified manufacturing process.

Although the upper and lower spacers 23 are arranged at the same positions when laterally viewed in FIG. 5B in case of exemplarily adopting discontinuous bodies like round-columnar shapes for the spacers 23 to be arranged at the peripheral portions of the bipolar electrodes 5, the arranging manner is not limited thereto of course and the spacers may be arranged at different positions insofar as capable of preventing contact between bipolar electrodes 5.

Further, although the number of discontinuous bodies to be used as the spacers 23 is not restricted to 12 shown in the figures and is not particularly limited insofar as capable of preventing contact between bipolar electrodes 5 depending on the sizes of spacers 23, the possibly minimum number within a range satisfying the above requirement is preferable from a standpoint of workability.

Although it is reliable that the arranged areas of the discontinuous bodies to be used as the spacers 23 extend along the four side portions of each current-collector 1 shown in FIG. 5A in an end-to-end manner, the arranged areas may be shorter insofar as capable of preventing contact between bipolar electrodes 5.

The material of the spacers 23 includes those capable of preventing contact between bipolar electrodes 5 to thereby prevent short-circuit therebetween, and preferably those materials which exemplarily have electric insulation property, chemical resistance (particularly alkali resistance), and heat resistance (concerning operating temperature of battery), are light-weighted and superior in workability, and have a superior compatibility (adhesive property, wettability) with the resin precursor for the electrolyte sealing portions. For example, polyethylene, polypropylene, polytetrafluoroethylene and polyester can be preferably used, without limited thereto.

The arrangement of the spacers 23 at the peripheral portions of the current-collectors 1 may be exemplarily conducted by tacking the spacers such as by paste, and finally fixing them upon forming the electrolyte sealing portions 21. It is of course possible to arrange (adhere) the spacers such as by heat sealing (heat welding), thermo-compression bonding in addition to the chemical adhering technique by the adhesive, without particularly limited thereto. Note, in case of adopting an adhesive, it is desirable to adopt such a material as the adhesive, which has electric insulation property and chemical resistance (alkali resistance) required for the material of spacers 23 and required for the resin of the electrolyte sealing portions 21.

Further, the arranging timing of the spacers 23 is not particularly limited, such as before or after forming (print coating) the positive electrode layer 2 and negative electrode layer 3.

Namely, after obtaining the electrode-stacked assembly 7 by stacking the bipolar electrodes 5 arranged with the above spacers 23 at the peripheral portions of the current-collectors 1, such an electrode-stacked assembly 7 is immersed into the sealing resin precursor 31 as represented by an arrow in FIG. 7A. Thereafter, the electrode-stacked assembly 7 is lifted out of the sealing resin precursor 31 and allowed to be cured, so that the sealing resin is injected to form the electrolyte sealing portions 21. Note, the spacers 23 can be regarded as parts of the sealing resin for the electrolyte sealing portions 21, because of the sealing function of the spacers.

The electrolyte sealing portions 21 formed by injection and curing of the sealing resin are required to be formed over the whole peripheries of the electrode layers 2, 3 of the electrode-stacked assembly 7 as shown in FIG. 5 and FIG. 6, from a standpoint of preventing the electrolytic solution from oozing out of the electrolyte layers 4. From a standpoint of battery property, the width $W_1$ of each electrolyte sealing portion 21 is to be desirably narrowed within a range capable of obtaining a sealing effect. There can be thus obtained a sufficient sealing effect, when the width $W_1$ of each electrolyte sealing portion 21 is on the order of 5 mm to 2 cm, even from the standpoint for ensuring the arrangement of the spacers.

Also in case of adopting a polymer solid electrolyte as the electrolyte layer 4, it is desirable to employ a constitution suitable for preventing contact between current-collectors 1 in the same manner as the above, because it is necessary to take account of contact between current-collectors 1 of the bipolar electrodes such as due to vibration and/or impact during assembling and usage of the battery. Although it is unnecessary to provide the electrolyte sealing portions 21 made of resin and it is enough to provide the spacers 23 in this case because the electrolytic solution is never oozed out, it is of course possible to provide the electrolyte sealing portions 21 made of the sealing resin.

The material of the electrolyte sealing portions (electrically insulative layers) 21 is not particularly limited insofar as having: an electric insulation property; a sealing property and an alkali resistance against an electrolytic solution (alkali solution) from the electrolyte layer; a sealing property against moisture permeation from the exterior; and a heat resistance at the battery operating temperature; and it is desirable to use a resin (including rubber) selected from a group comprising silicone, epoxy, urethane, polybutadiene, polypropylene, polyethylene, and paraffin wax. This is because, these resins are superior in sealing property (liquid-tight property), chemical resistance (alkali resistance), durability/weather resistance, and heat resistance, are capable of effectively preventing the electrolytic solution from oozing out of the electrolyte layer to thereby prevent liquid junction due to the oozing of the electrolytic solution over a long period of time, and are capable of being injected as the resin precursor into the gaps around the electrode-stacked assembly 7 thereby allowing to readily adjust the viscosity of the resin to such a degree that the arranged spacers are completely encapsulated into the sealing portions. Epoxy resin is desirable, such as from a standpoint of corrosion resistance, chemical resistance, readiness of production (film-forming ability) and economical efficiency.

As described above, in the bipolar battery 11 adopting the electrode-stacked assembly 7 provided with the spacers 23 within the electrolyte sealing portions 21 so as to keep the gaps between current-collectors 1, the electrolyte sealing portions 21 can be formed without contact between current-collectors 1 of the bipolar electrodes 5 upon injecting the resin precursor into the gaps at the peripheral portion of the bipolar battery 11 by virtue of the function of the spacers 23, thereby enabling to avoid electric short-circuit between the bipolar electrodes 5.

Further, the electrolyte sealing portions 21 including spacers 23 can be formed around the whole peripheries of the electrode layers 2, 3, thereby allowing to effectively prevent the electrolytic solution contained in the electrolyte layer 4 from oozing out up to the exterior of the electrolyte sealing portions 21. This enables to provide the bipolar battery 11 of high-quality having a higher safety in which the electrolytic solution of each unit cell layer 6 never contacts with that of another unit cell layer to thereby avoid liquid junction.

Although there has been mainly described such a constituent part that the electrolyte sealing portion as a component of a characterizing part of the bipolar battery according to this embodiment is provided with the spacers for keeping gaps between the bipolar electrodes, the other components are not particularly limited and are widely applicable.

There will be briefly and mainly explained hereinafter the components other than the electrolyte sealing portions and spacers of the bipolar batteries.

Current-Collector

Various constitutions can be utilized as the current-collector 1 usable in this embodiment without any particular limitation, and it is possible to preferably adopt: aluminum foil; stainless steel foil; cladding material comprising nickel and aluminum; cladding material comprising copper and aluminum; and plated material combining these metals. Further, the current-collector 1 may comprise a metal having a surface coated with aluminum. It is possible to adopt a current-collector 1 comprising two or more sheets of metal foils adhered to each other, as the case may be. Only, it is desirable to employ an aluminum foil as the current-collector 1, from a standpoint of corrosion resistance, readiness of production, and economical efficiency.

The thickness of the current-collector 1 is preferably on the order of 1 to 100 μm, without particularly limited thereto.

Positive Electrode Layer

The positive electrode layer 2 usable in this embodiment includes a positive-electrode-aimed active material (positive active material). Additionally, it exemplarily includes: an electroconductive adjuvant for enhancing the electron conductivity; a lithium salt for enhancing the ion conductivity; a binder; and an electrolyte such as a polymer electrolyte (including host polymer and electrolytic solution) similar to the electrolyte layer 4 to be described later. In case of adopting the polymer gel electrolyte as the electrolyte, it is enough for the positive electrode layer 2 to exemplarily include: the binder for binding fine particles of the positive-electrode-aimed active material; and the electroconductive adjuvant for enhancing the electron conductivity; while the host polymer and electrolytic solution as the materials of polymer electrolyte and the lithium salt are not indispensable and thus may be omitted. Also in the case of adopting the solution electrolyte as the electrolyte, the host polymer and electrolytic solution as the materials of polymer electrolyte and the lithium salt are not indispensable to the positive electrode layer 2 and thus may be omitted.

In the above, usable as the positive-electrode-aimed active material is a complex oxide (lithium-transition metal complex oxide) of transition metal and lithium, which is also used in a solution-based lithium-ion battery. Concretely, the complex oxide includes Li/Co-based complex oxide such as $LiCoO_2$, Li/Ni-based complex oxide such as $LiNiO_2$, Li/Mn-based complex oxide such as spinel $LiMn_2O_4$, and Li/Fe-based complex oxide such as $LiFeO_2$. Additionally, the complex oxide includes: a compound of transition metal and lithium with phosphoric acid or sulfuric acid, such as $LiFePO_4$; oxide or sulfide of transition metal such as $V_2O_5$, $MnO_2$, $TiS_2$, $MoS_2$, $MoO_3$; and $PbO_2$, AgO and NiOOH.

To reduce the electrical resistance of the bipolar battery, it is preferable that the particle size of the positive-electrode-aimed active material is smaller than the particle size typically adopted in a solution-type lithium-ion battery. Concretely, the fine particles of the positive-electrode-aimed active material preferably have an averaged particle size of 0.1 to 5 μm.

The electroconductive adjuvant includes acetylene black, carbon black, graphite, without limited thereto.

Usable as the binder is polyvinylidene fluoride (PVDF), without limited thereto.

The polymer gel electrolyte comprises the polymer solid electrolyte having ion conductivity and containing the electrolytic solution to be used in a lithium-ion battery, and further embraces those including a polymer structure having no conductivity for lithium ion while holding the same electrolytic solution.

The electrolytic solution (electrolytic salt and plasticizer) to be contained in the polymer gel electrolyte includes those usable for a lithium-ion battery, and embraces those adopting:

at least one kind of lithium salt (electrolytic salt) selected from a group comprising anionic salt of inorganic acid such as $LiPF_6$, $LiBF_4$, $LiClO_4$, $LiAsF_6$, $LiTaF_6$, $LiAlCl_4$, $Li_2B_{10}Cl_{10}$, and anionic salt of organic acid such as $LiCF_3SO_3$, $Li(CF_3SO_2)_2N$ and $Li(C_2F_5SO_2)_2N$; and an organic solvent (plasticizer) such as an aprotic solvent obtained by selecting at least one kind from or mixing two or more kinds of: cyclic carbonates such as propylene carbonate, ethylene carbonate; linear carbonates such as dimethyl carbonate, methyl ethyl carbonate, diethyl carbonate; ethers such as tetrahydrofuran, 2-methyl tetrahydrofuran, 1,4-dioxane, 1,2-dimethoxy ethane, 1,2-dibutoxy ethane; lactones such as γ-butyrolactone; nitryls such as acetonitrile; esters such as methyl propionate; amides such as dimethyl formamide; and methyl acetate and methyl formate; without limited thereto.

The polymer solid electrolyte having ion conductivity exemplarily includes polyethylene oxide (PEO), polypropylene oxide (PPO), and copolymer thereof.

The polymer having no lithium-ion conductivity and usable as the polymer gel electrolyte exemplarily includes polyvinylidene fluoride (PVDF), polyvinyl chloride (PVC), polyacrylonitrile (PAN), and polymethyl methacrylate (PMMA), without limited thereto. Note, although it is not impossible to classify the PAN and PMMA into polymers having ion conductivity, these materials are exemplarily classified into polymers having no lithium-ion conductivity and usable in a polymer gel electrolyte because the PAN and PMMA are classified into materials substantially having no ion conductivity.

The lithium salt includes anionic salt of inorganic acid such as $LiPF_6$, $LiBF_4$, $LiClO_4$, $LiAsF_6$, $LiTaF_6$, $LiAlCl_4$, $Li_2B_{10}Cl_{10}$, anionic salt of organic acid such as $Li(CF_3SO_2)_2N$ and $Li(C_2F_5SO_2)_2N$, and mixture thereof, without limited thereto.

The ratio (weight ratio) between the host polymer and electrolytic solution within the polymer gel electrolyte is to be determined based on the purpose of use, and is preferably within a range of 2:98 to 90:10. Namely, the oozing of the electrolytic solution out of the electrolyte material in the electrolyte layer 4 can be effectively sealed by providing the electrolyte sealing portion 21. Thus, the battery property is relatively prioritized, also concerning the ratio (weight ratio) between the host polymer and electrolytic solution within the polymer gel electrolyte.

Further, the blending amounts of the positive-electrode-aimed active material, electroconductive adjuvant, binder, polymer electrolyte (such as host polymer and electrolytic solution) and lithium salt shall be determined in view of the purpose of use (such as priority of output or energy) and ion conductivity. For example, in case of using the gel electrolyte as the electrolyte layer, excessively lower blending amounts of the polymer electrolyte within the positive electrode layer 2 increases the ion conduction resistance, ion diffusion resistance and the like within the positive electrode layer 2 to thereby deteriorate the battery performance. Contrary, excessively larger blending amounts of the polymer electrolyte within the positive electrode layer 2 rather reduces the energy density of the battery. Thus, the amount of the polymer gel electrolyte is to be determined conforming to the purpose and taking account of these factors.

Further, the thickness of the positive electrode layer 2 is not particularly limited, and shall be determined in view of the purpose of use (such as priority of output or energy) of the battery, as described concerning the blending amount. The thickness of the positive electrode layer 2 is desirably on the order of 10 to 500 μm.

Negative Electrode Layer

The negative electrode layer 3 usable in this embodiment includes a negative-electrode-aimed active material (positive active material). Additionally, it is possible to include: an electroconductive adjuvant for enhancing the electron conductivity; a binder; electrolytes such as polymer electrolyte (such as host polymer and electrolytic solution); and lithium salt for enhancing the ion conductivity. In case of adopting the polymer gel electrolyte as the electrolyte, it is enough for the negative electrode layer 3 to exemplarily include: the binder for binding fine particles of the negative-electrode-aimed active material; and the electroconductive adjuvant for enhancing the electron conductivity; while the host polymer and electrolytic solution as the materials of polymer electrolyte and the lithium salt are not indispensable and thus may be omitted. Also in the case of adopting the solution electrolyte as the electrolyte, the host polymer and electrolytic solution as the materials of polymer electrolyte and the lithium salt are not indispensable to the negative electrode layer 3 and thus may be omitted. The details other than the types of the negative-electrode-aimed active material are basically the same as those described concerning the paragraphs for the positive electrode layer, so that the explanation of the former shall be omitted here.

Usable as the negative-electrode-aimed active material are those to be used in solution-based lithium-ion batteries. Concretely, it is possible to exemplarily adopt carbon, metal oxide, lithium-metal complex oxide, and preferably carbon or lithium-transition metal complex oxide. This is because, adopting them enables to constitute a battery superior in a capacity and output characteristics (such as capability of increased battery voltage). Note, it is possible to exemplarily adopt lithium-titanium complex oxide, as the lithium-transition metal complex oxide. As the carbon, it is possible to exemplarily adopt graphite, acetylene black and carbon black.

Electrolyte Layer

It is possible to aim at a separator impregnated with electrolyte or at a polymer gel electrolyte (including an unwoven fabric separator which holds polymer gel electrolyte therein) as the electrolyte layer 4, from a standpoint that the bipolar battery 11 of this embodiment exhibits a battery constitution suitable for preventing the contact between bipolar electrodes 5 upon forming the electrolyte sealing portions 21 so as to prevent the oozing of the electrolytic solution out of the electrolyte layer 4. However, since it may be required to take account of contact between bipolar electrodes 5 upon manufacturing the bipolar battery 11 even concerning the polymer solid electrolyte, it is desirable to adopt a battery constitution suitable for preventing such contact.

Thus, the constitution of this embodiment is applicable to any of A: polymer gel electrolyte (including an unwoven fabric separator which holds polymer gel electrolyte therein), B: polymer solid electrolyte, or C: separator impregnated with electrolytic solution, correspondingly to the purpose of use. These constitutions will be successively described hereinafter.

A: Re Polymer Gel Electrolyte

As the polymer gel electrolyte (including an unwoven fabric separator which holds polymer gel electrolyte therein), it is possible to appropriately utilize those used in the gel electrolyte layer, without particularly limited thereto. Herein, the term "gel electrolyte" means a polymer matrix which holds an electrolytic solution therein. Note, the difference between a polymer full-solid electrolyte (simply and occasionally called "polymer solid electrolyte") and the gel electrolyte is summarized as follows.

The gel electrolyte comprises: a polymer full-solid electrolyte such as polyethylene oxide (PEO); and an electrolytic solution to be used in a lithium-ion battery, contained in the polymer full-solid electrolyte. Also classified as a gel electrolyte is an electrolyte comprising: a polymer structure such as polyvinylidene fluoride (PVDF) having no lithium-ion conductivity; and an electrolytic solution held therein. The ratio between the polymer (also called "host polymer" or "polymer matrix") and the electrolytic solution cooperatively constituting the gel electrolyte is so wide, and all intermediates are applicable to gel electrolytes when assuming that the 100 wt. % of polymer is a polymer full-solid electrolyte and the 100 wt. % of electrolytic solution is a liquid electrolyte.

The host polymer of such a gel electrolyte desirably includes polyethylene oxide (PEO), polypropylene oxide (PPO), polyethylene glycol (PEG), polyvinylidene fluoride (PVDF), polyvinyl chloride (PVC), polyacrylonitrile (PAN), polyvinylidene fluoride-hexafluoropropylene (PVDF-HFP), polymethyl methacrylate (PMMA), and copolymer thereof; and the solvent of the gel electrolyte desirably includes ethylene carbonate (EC), propylene carbonate (PC), γ-butyrolactone (GBL), dimethyl carbonate (DMC), diethyl carbonate (DEC), and the mixture thereof.

Further, the electrolytic solution (electrolytic salt and plasticizer) of the gel electrolyte are not particularly limited. Concretely, the electrolytic solution includes those usable for a lithium-ion battery, and embraces those adopting:

at least one kind of lithium salt (electrolytic salt) selected from a group comprising anionic salt of inorganic acid such as $LiPF_6$, $LiBF_4$, $LiClO_4$, $LiAsF_6$, $LiTaF_6$, $LiAlCl_4$, $Li_2B_{10}Cl_{10}$, and anionic salt of organic acid such as $LiCF_3SO_3$, $Li(CF_3SO_2)_2N$ and $Li(C_2F_5SO_2)_2N$; and an organic solvent (plasticizer) such as an aprotic solvent obtained by selecting at least one kind from or mixing two or more kinds of: cyclic carbonates such as propylene carbonate, ethylene carbonate; linear carbonates such as dimethyl carbonate, methyl ethyl carbonate, diethyl carbonate; ethers such as tetrahydrofuran, 2-methyl tetrahydrofuran, 1,4-dioxane, 1,2-dimethoxy ethane, 1,2-dibutoxy ethane; lactones such as γ-butyrolactone; nitryls such as acetonitrile; esters such as methyl propionate; amides such as dimethyl formamide; and methyl acetate and methyl formate.

Although the ratio of the electrolytic solution in the gel electrolyte is not particularly limited, it is desirable to set the ratio on the order of several wt. % to 98 wt. % such as from a standpoint of ionic conductivity. In the present invention, it is particularly effective to adopt the electrolytic-solution rich gel electrolytes including electrolytic solution in the ratio of 70 wt. % or more.

The amount of the electrolytic solution contained in the gel electrolyte may be substantially uniform within the gel electrolyte, or progressively reduced from the center to the outer periphery of the gel electrolyte. The former desirably enables to obtain reactivities over a wider range, while the latter desirably enables to enhance the sealing property of the outer periphery of the polymer full-solid electrolyte portion against the electrolytic solution therein. In case of the progressive reduction from the center to the outer periphery, it is desirable to adopt polyethylene oxide (PEO), polypropylene oxide (PPO) or the copolymer thereof having a lithium-ion conductivity, as the host polymer.

Further, the electrolyte layer 4 may be an unwoven fabric separator which holds polymer gel electrolyte therein (see the embodiment to be described later).

The unwoven fabric separator used to hold the polymer gel electrolyte therein is not particularly limited, and can be manufactured by entwining fibers into a sheet. Further, it is possible to utilize a spunbonded fabric to be obtained by fusion bonding the fibers by heat. Namely, any sheet-like fabric will do, which is fabricated by arranging fibers into a web (thin cotton) shape or a mat shape by an appropriate technique, and by joining the fibers by an appropriate adhesive or a fusion bonding force of the fibers themselves.

Such an adhesive is not particularly limited, insofar as having a sufficient heat resistance at the temperatures upon production and usage, and being stable by virtue of absence of reactivity and solubility to the gel electrolyte. The usable fibers are not particularly limited, and include: cotton; rayon; acetate; nylon; polyester; polyolefin such as polypropylene, polyethylene; polyimide; aramid; solely or mixedly, correspondingly to the purpose of use (such as mechanical strength required for the electrolyte layer).

The bulk density of the unwoven fabric is not particularly limited, insofar as enabling to obtain a sufficient battery property by the impregnated polymer gel electrolyte. Namely, excessively larger bulk densities of the unwoven fabric lead to excessively larger ratios of the nonelectrolytic material in the electrolyte layer, thereby possibly and exemplarily deteriorating the ionic conductivity in the electrolyte layer.

The unwoven fabric separator desirably has a porosity of 50 to 90%. Porosities less than 50% deteriorate the holding ability for the electrolytic solution, while porosities exceeding 90% lead to an insufficient strength. It is sufficient for the thickness of the unwoven fabric separator to be the same as the electrolyte layer to be described later, and this thickness is preferably 5 to 200 µm, and more preferably 10 to 100 µm.

As the continuous body of unwoven fabric to be used as the spacer, the electrically insulating material can be utilized among the above-mentioned unwoven fabric separators. Also in case of the continuous bodies of unwoven fabric, those having porosities on the order of 50 to 90% can be utilized.

B. Re Polymer Solid Electrolyte

As the polymer solid electrolyte, it is possible to utilize those which are capable of acting as layers constituted of polymers having ion conductivity so as to exhibit ion conductivity, without particularly limited thereto. The polymer full-solid electrolyte includes polymer solid electrolytes such as polyethylene oxide (PEO), polypropylene oxide (PPO), and the copolymer thereof. To be contained in the polymer solid electrolyte is lithium salt for ensuring ion conductivity. Usable as the lithium salt are $LiBF_4$, $LiPF_6$, $LiN(SO_2CF_3)_2$, $LiN(SO_2C_2F_5)_2$ and the mixture thereof, without limited thereto. The polyalkylene oxide-based polymers such as PEO and PPO allow lithium salts such as $LiBF_4$, $LiPF_6$, $LiN(SO_2CF_3)_2$, $LiN(SO_2C_2F_5)_2$ to dissolve in the polymer. Further, there is formed a cross-linking structure to thereby exhibit a superior mechanical strength.

C. Re Separator Impregnated with Electrolytic Solution

Since the usable electrolytic solution to be impregnated into the separator at issue is the same as the electrolytic solution (electrolytic salt and plasticizer) contained in the polymer gel electrolyte of the above described positive electrode layer, the detailed explanation thereof shall be omitted here.

Exemplarily usable as such a separator is a porous sheet comprising polymer which absorbs and holds the above-mentioned electrolytic solution (for example, polyolefin-based microporous separator). The polyolefin-based microporous separator, which has a chemically stable nature to organic solvent, exhibits an excellent effect to restrict the reactivity with the electrolyte (electrolytic solution) to a lower degree. The material of such a polymer exemplarily includes: polyethylene (PE); polypropylene (PP); a laminated body having a three-layered structure of PP/PE/PP; and polyimide.

Although the thickness of the separator is not unequivocally determined since the same varies depending on the purpose of use, such a thickness is desirably 4 to 60 µm in a single layer or multiple layers in a usage such as a secondary battery for driving a motor in an electric vehicle (EV) or hybrid electric vehicle (HEV). The thickness of the separator in this range exhibits such an effect that the short-circuit to be possibly caused by biting of fine particles into the separator can be prevented to allow to narrow the gap between electrodes of higher output, thereby ensuring the mechanical strength in the thickness direction as well as an increased output characteristic. Further, since the surface areas of electrodes are increased in case of connecting multiple batteries, it is desirable to use the thicker separator within the above range so as to enhance the reliability of the batteries.

The diameter of micropores of the separator is desirably 1 µm or less at the maximum (i.e., the averaged pore diameter is on the order of several tens nm). The averaged diameter of the micropores of the separator in the above range exhibits such an effect of enhanced reliability upon abnormality and a resultingly improved heat resistance, because there is rapidly caused a so-called shut-down phenomenon in which the separator is melted by heat to thereby close the micropores. Namely, since the shut-down phenomenon, in which the separator is melted to close the micropores, is rapidly caused when the battery temperature is raised due to overcharge (upon abnormality), Li ion is inhibited from passing from a positive electrode (+) to a negative electrode (−) of the battery (electrodes), thereby disabling further charge. This disables and eliminates overcharge, thereby resultingly improving the heat resistance (safety) of the battery and further enabling to prevent splitting of the heat sealed portion (sealing portion) of the battery armoring material due to generation of gas. Here, the averaged diameter of micropores of the separator is a value calculated as an averaged diameter, by observing the separator such as by a scanning electron microscope and by statistically processing the obtained photograph such as by an image analyzer.

The porosity of the separator is desirably 20 to 50%. The porosity of the separator in the above range exhibits such an effect that the output deterioration due to resistance of the electrolyte (electrolytic solution) can be prevented, and also the short-circuit to be caused by penetration of fine particles through the pores (micropores) of the separator can be prevented, thereby ensuring both of the output and the reliability. Herein, the "porosity" of the separator is a value to be obtained as a volume ratio between a density of a constituent material resin and a density of the separator as a final product.

Although it is enough for the impregnated amount of the electrolytic solution into the separator up to the due liquid holding limit of the separator, the electrolytic solution may be impregnated up to an amount exceeding such a due limit. This is because, the oozing of electrolytic solution out of the electrolyte layer can be prevented by providing the electrolyte sealing portion by resin injection, thereby enabling to impregnate the electrolytic solution up to such an amount insofar as held in the electrolyte layer. It is further possible to impregnate the electrolytic solution into the separator by an appropriate technique, such as by leaving a solution through-hole (one location), between each two opposed electrodes upon providing the electrolyte sealing portion by resin injection, such that the solution is injected through the solution through-hole such as by a vacuum solution-injecting method, and then the resin is injected into the solution through-hole to thereby fully seal the through-hole.

It is naturally possible to combiningly use the above-mentioned electrolyte layers, in a single bipolar battery 11.

While the polymer electrolytes may be included in the polymer gel electrolyte layer, positive-electrode-aimed active material layer and negative-electrode-aimed active material layer, it is possible to use the same polymer electrolyte or to use different polymer electrolytes for layer by layer.

Incidentally, the host polymer presently and preferably used for polymer gel electrolytes is a polyether-based polymer such as PEO and PPO. This results in a lower oxidation resistance at the positive electrode side under a high temperature condition. It is thus desirable that the capacity of the negative electrode is lower than that of the positive electrode opposing thereto via polymer gel electrolyte layer, in case of adopting a positive electrode material which is typically used in a solution-based lithium-ion battery and which has a higher oxidation-reduction potential. Capacities of the negative electrode lower than that of the opposing positive electrode enables to prevent an excessively raised potential of the positive electrode at the end of charge. Note, the capacities of the positive electrode and negative electrode can be obtained from the manufacturing condition, as theoretical capacities upon manufacturing the positive electrode and negative electrode. It is of course possible to directly measure the capacities of the finished product.

However, it is necessary to pay attention to the charge and discharge voltages, because the negative electrode potential excessively lowers to thereby deteriorate the durability of the battery when the capacity of the negative electrode is lower than that of the opposing positive electrode. It is exemplarily required to be so careful that the durability is not deteriorated, by setting the averaged charge voltage of one cell (unit cell layer) relative to the oxidation-reduction potential of the positive-electrode-aimed active material to be used.

The thickness of the electrolyte layer 4 is not particularly limited. However, it is preferable to reduce the thickness to the minimum so as to obtain a compact bipolar battery 11, insofar as the function of the electrolyte is ensured. The concrete thickness of the electrolyte layer is 5 to 200 µm, and preferably on the order of 10 to 100 µm.

Positive Electrode and Negative Electrode Terminal Plates

The positive electrode and negative electrode terminal plates may be simply provided as the positive and negative electrode leads 8, 9, respectively, or may be provided to cover even the current-collectors 5a, 5b from the outside. In case of using in this manner, although the terminal plates are preferably as thin as possible from a standpoint of reduced thickness while achieving a function as the leads, it is desirable for the terminal plates to have a strength capable of clamping and supporting the stacked electrode layers 2, 3, electrolyte layer 4 and current-collectors 1, 5a, 5b from both sides of them because these components have weaker mechanical strength. Further, from a standpoint to restrict the internal resistance, the thicknesses of the positive electrode and negative electrode terminal plates are desirably on the order of 0.1 to 2 mm.

Usable materials for the positive electrode and negative electrode terminal plates are those used in lithium-ion batteries. For example, it is possible to use aluminum, copper, titanium, nickel, stainless steel (SUS), and alloys thereof. Aluminum is preferably used, from a standpoint of corrosion resistance, readiness of production, and economical efficiency.

The materials of the positive electrode and negative electrode terminal plates may be the same or different. Further, each of the positive electrode and negative electrode terminal plates may be a laminated body comprising different material layers.

It is enough for the positive electrode and negative electrode terminal plates to be the same sizes as the current-collectors.

Positive and Negative Electrode Leads

Usable as the positive and negative electrode leads 8, 9 are those leads to be used in lithium-ion batteries. Note, because those portions drawn out of the battery armoring material (battery casing) are closer to a heat source of a vehicle, it is desirable to coat the drawn out portions such as by heat shrinkable tubes having heat resistance and electric insulation property so as not to affect other vehicular parts (particularly, electronic equipments) due to contact with the heat source.

Battery Armoring Material (Battery Casing)

It is preferable to accommodate the whole of the electrode-stacked assembly 7 acting as the body of the bipolar battery 11 into the battery armoring material or battery casing 10, so as to prevent impact from the exterior and environmental degradation upon using the battery. From a standpoint of lightening, it is desirable to adopt the battery armoring material 10 such as a polymer-metal composite laminated film or aluminum laminate pack comprising metal such as aluminum, stainless steel, nickel or copper (including alloy) coated with an electrical insulator such as a polypropylene film, and to join a part or whole of the peripheral portion of the electrical insulator by heat sealing (heat welding) to thereby establish a constitution which houses and hermetically seals the electrode-stacked assembly 7 therein. In this case, the positive and negative electrode leads 8, 9 are structurally interposed between heat sealed portions and exposed to the exterior of the battery armoring material 10. It is further desirable to adopt the polymer-metal composite laminated film or aluminum laminate pack having a superior thermal conductivity, because the same transmits the heat from the heat source of the vehicle, thereby allowing to rapidly heat the interior of battery to the battery operating temperature.

There will be explained hereinafter the manufacturing method of the bipolar battery 11 having the above constitution of this embodiment, more concretely. Such a manufacturing method is not restrictive, of course. Further, there has been already described the technique for arranging the spacers 23 at the peripheral portions of the bipolar electrodes 5 upon stacking the bipolar electrodes and then forming the electrolyte sealing portions 21 by resin injection with respect to FIG. 7A through FIG. 8C, so that the explanation thereof shall be omitted or simplified here.

Coating of Positive-Electrode-Aimed Composition

The current-collector 1 is firstly prepared. The positive-electrode-aimed composition is obtained as a slurry (positive-electrode-aimed slurry) and coated onto one side of the current-collector 1.

Such a positive-electrode-aimed slurry is a solution containing the positive-electrode-aimed active material. Other components are arbitrarily contained, such as electroconductive adjuvant, binder, polymerization initiator, electrolyte constituent materials (such as solid-electrolyte-aimed polymer, or host polymer and electrolytic solution), supporting salt (lithium salt) and slurry-viscosity adjusting solvent. Namely, similarly to the solution-based lithium-ion battery, the positive-electrode-aimed slurry can be obtained by exemplarily mixing the electroconductive adjuvant, electrolyte constituent materials, supporting salt (lithium salt), slurry-viscosity adjusting solvent and polymerization initiator at predetermined ratios, in addition to the positive-electrode-aimed active material.

In case of adopting the polymer gel electrolyte for the electrolyte layer 4, it is enough to exemplarily include: the binder for mutually binding the fine particles of positive-electrode-aimed active material; the electroconductive adjuvant for enhancing the electron conductivity; and the solvent; and the host polymer and electrolytic solution as constituent materials of the polymer gel electrolyte and the lithium salt may be contained or omitted. This is also true, in case of adopting a separator impregnated with electrolytic solution, as the electrolyte layer 4.

The polymer material (host polymer as constituent material of polymer gel electrolyte, or polymer material of polymer solid electrolyte) for the electrolyte exemplarily includes PEO, PPO and copolymer thereof, which desirably has a cross-linking functional group (such as carbon-carbon double bond). Cross-linking the polymer electrolyte by this cross-linking functional group improves the mechanical strength thereof.

Concerning the positive-electrode-aimed active material, electroconductive adjuvant, binder and lithium salt, the above-mentioned compounds are usable.

The polymerization initiator is to be selected depending on the compound to be polymerized. It exemplarily includes benzil methyl ketal as a photopolymerization initiator, and azobisisobutyronitrile as a thermal polymerization initiator.

To be selected correspondingly to the kind of the positive-electrode-aimed slurry is a solvent such as N-methyl-2-pyrrolidone (NMP).

The adding amounts of the positive-electrode-aimed active material, lithium salt and electroconductive adjuvant may be adjusted exemplarily corresponding to the purpose of the bipolar battery. The adding amount of the polymerization initiator is determined correspondingly to the number of cross-linking functional groups contained in the raw polymer material. This is preferably on the order of 0.01 to 1 wt. % relative to the raw polymer material.

Formation of Positive Electrode Layer

The current-collector 1 coated with the positive-electrode-aimed slurry is dried to eliminate the contained solvent. It is possible to simultaneously progress the cross-linking reaction to enhance the mechanical strength of the polymer solid electrolyte, depending on the type of positive-electrode-aimed slurry. Drying can be conducted such as by a vacuum drier. While the drying conditions are determined depending on the coated positive-electrode-aimed slurry and are not unequivocally defined, the conditions are preferably 40 to 150° C. for 5 minutes to 20 hours. Such a drying treatment forms the positive electrode layer 2 on the current-collector 1.

Coating of Negative-Electrode-Aimed Composition

The negative-electrode-aimed composition (negative-electrode-aimed slurry) containing the negative-electrode-aimed active material is coated onto a side opposite to that side of the current-collector 1 formed with the positive electrode layer 2. The sequences of coating the positive-electrode-aimed slurry and negative-electrode-aimed slurry are arbitrary, and can be simultaneous with each other as the case may be.

The negative-electrode-aimed slurry is a solution containing the negative-electrode-aimed active material. Other components are arbitrarily contained, such as electroconductive adjuvant, binder, polymerization initiator, electrolyte constituent materials (such as solid-electrolyte-aimed polymer, or host polymer and electrolytic solution), supporting salt (lithium salt) and slurry-viscosity adjusting solvent. The constituent materials to be used and adding amounts thereof are the same as those as explained concerning the above-mentioned coating of positive-electrode-aimed composition, so that the explanation thereof is omitted here.

Formation of Negative Electrode Layer

The current-collector 1 coated with the negative-electrode-aimed slurry is dried to eliminate the contained solvent. It is possible to simultaneously progress the cross-linking reaction to enhance the mechanical strength of the polymer gel electrolyte, depending on the type of negative-electrode-aimed slurry. Drying can be conducted such as by a vacuum drier. While the drying conditions are determined depending on the coated negative-electrode-aimed slurry and are not unequivocally defined, the conditions are preferably 40 to 150° C. for 5 minutes to 20 hours. Such a drying treatment forms the negative electrode layer 3 on the current-collector 1. This operation completes the bipolar electrode 5, if the positive electrode layer 2 has been also formed.

Formation of Electrolyte Layer

In case of adopting a polymer solid electrolyte as the electrolyte layer 4, it is manufactured by hardening a solution prepared by dissolving the constituent polymer of the polymer solid electrolyte, a lithium salt and the like in a solvent such as NMP. Further, in case of adopting the polymer gel electrolyte layer, this layer is manufactured by heating, drying and simultaneously polymerizing (i.e., promoting a cross-linking reaction in) a pre-gel solution such as containing a host polymer and electrolytic solution as constituent materials of polymer gel electrolyte, a lithium salt and a polymerization initiator, in an inert atmosphere. Further, in case of adopting a polymer gel electrolyte layer comprising an unwoven fabric separator which holds a polymer gel electrolyte therein, this layer is manufactured by causing the unwoven fabric separator to be impregnated with a pre-gel solution such as containing a host polymer and electrolytic solution as constituent materials of polymer gel electrolyte, a lithium salt and a polymerization initiator, and by heating, drying and simultaneously polymerizing (i.e., promoting a cross-linking reaction in) the pre-gel solution (see also the embodiments to be described later).

For example, the prepared solution or pre-gel solution is coated onto the positive and/or negative electrode layers 2, 3, to a predetermined thickness. Thereafter, the solution or pre-gel solution coated onto the bipolar electrode 5 is heated, dried and simultaneously polymerized (the cross-linking reaction is promoted therein) in an inert atmosphere, so as to enhance the mechanical strength of the electrolyte, thereby completing the electrolyte layer 4 in a film-forming manner.

It is also possible to separately prepare the electrolyte layer 4 to be stacked between the electrodes. For example, the electrolyte layer 4 is manufactured by coating the adjusted solution or pre-gel solution onto an appropriate film such as a PET film, and heating, drying and simultaneously polymerizing (promoting a cross-linking reaction in) the solution or pre-gel solution in an inert atmosphere. Alternatively, the polymeric gel electrolyte layer 4 comprising an unwoven fabric separator holding polymeric gel electrolyte therein is manufactured by impregnating such a solution or pre-gel solution into an appropriate unwoven fabric separator such as made of PP, and by hardening or heating, drying and simultaneously polymerizing (promoting a cross-linking reaction in) the solution or pre-gel solution in an inert atmosphere.

The hardening or heating, drying can be conducted such as by a vacuum drier (vacuum oven). Although the conditions of heating and drying are determined depending on the solution or pre-gel solution and are not unequivocally defined, the conditions are preferably 30 to 110° C. for 0.5 to 12 hours.

The thickness of the electrolyte layer 4 can be set by exemplarily using spacers for defining such a thickness. Further, in case of using a photopolymerization initiator, the due polymer is injected into a light transmissive mold having a gap of pertinent length, and ultraviolet light is irradiated by using an ultraviolet light irradiating apparatus capable of causing drying and photopolymerization, so as to photo-polymerize the polymer in the electrolyte layer and to progress the cross-linking reaction, thereby forming the film. However, this technique is not restrictive of course, and it is possible to suitably use the radiation-induced polymerization, electron-beam induced polymerization and thermal polymerization, depending on the kind of the polymerization initiator.

Further, the film used in the above is to desirably have a sufficient heat resistance at temperatures of about 80° C. because the film may be heated to about 80° C. during a manufacturing process, is not reactive to the solution or pre-gel solution, and is superior in a releasing ability because the film is required to be separated and removed during the manufacturing process, so that polyethylene terephthalate (PET) and polypropylene film can be used, without particularly limited thereto.

The width of the electrolyte layer 4 may be slightly smaller than the size of the current-collector 1 of the bipolar electrode 5.

The adjustment of the constituent components of the above solution or pre-gel solution as well as the blending amounts thereof are to be appropriately determined corresponding to the purpose of use.

Note, the separator impregnated with the electrolytic solution has the same constitution as the electrolyte layer used in the solution-based bipolar battery, and can be manufactured by various manufacturing methods such as: a method for interposing separators impregnated with the electrolytic solution between the bipolar electrodes; or a vacuum solution-injecting method.

Stacking of Bipolar Electrodes and Electrolyte Layers

In case of a bipolar electrode 5 formed with the electrolyte layer(s) 4 at one or both sides of the bipolar electrode 5, the raw bipolar electrode 5 formed with the electrolyte layer(s) 4 is sufficiently heated and dried under high vacuum, and then cut into multiple bipolar electrodes 5 in appropriate sizes, such that the cut out bipolar electrodes 5 are directly bonded to each other to fabricate the bipolar battery body (electrode-stacked assembly) 7.

Alternatively, when the bipolar electrodes 5 and electrolyte layers 4 are to be separately prepared, the raw bipolar electrode 5 and raw electrolyte layer 4 are sufficiently heated and dried under high vacuum, and then cut into bipolar electrodes 5 and electrolyte layers 4 in appropriate sizes, respectively. The predetermined numbers of cut out bipolar electrodes 5 and electrolyte layers 4 are mutually bonded, thereby allowing to fabricate the bipolar battery body (electrode-stacked assembly) 7.

The number of stacked layers included in the electrode-stacked assembly 7 is determined taking account of the battery property demanded for the bipolar battery 11. Further, arranged as the outermost layer at the positive electrode side of the electrode-stacked assembly is an electrode 5a comprising a current-collector 1 formed with only a positive electrode layer 2. Contrary, arranged as the outermost layer at the negative electrode side of the electrode-stacked assembly is an electrode 5b comprising a current-collector 1 formed with only a negative electrode layer 3. The step for obtaining the bipolar battery 11 by stacking the bipolar electrodes 5 and electrolyte layers 4 or by stacking the bipolar electrodes 5 formed with electrolyte layers 4, is preferably conducted in an inert atmosphere, from a standpoint of exemplarily preventing moisture content from entering the bipolar battery 11. For example, the bipolar battery 11 may be preferably prepared in an argon atmosphere or nitrogen atmosphere.

Arrangement of Spacer

As described above, multiple spacers 23 in round-columnar shapes are arranged at the peripheral portions of the bipolar electrodes 5 such as by adhering with adhesive or by tacking with paste as shown in FIG. 5A and FIG. 5B, upon alternately bonding and stacking the bipolar electrodes 5 and electrolyte layers 4 such as polymer solid electrolytes. Note, such an arranging procedure may be conducted at this stage, or the spacers may be previously arranged such as before forming the positive electrode layers 2 and negative electrode layers 3.

Formation of Electrolyte Sealing Portion (Electrically Insulative Layer)

As shown in FIGS. 7A and 7B, each of four sides of the outer periphery of the electrode-stacked assembly 7 obtained in the above manner was exemplarily immersed into an epoxy resin (precursor solution) as the sealing-portion-aimed resin from the outside thereof, and the epoxy resin was thereafter cured to thereby form the electrolyte sealing portions 21 at a predetermined width (the width $W_1$ in FIG. 6, such as about 10 mm). Namely, the four sides of the battery (electrode-stacked assembly) 7 were sequentially immersed into the resin precursor to thereby form a rectangular and continuous electrolyte sealing portion 21 between two adjacent current-collectors 1, 1 in a manner to correspond to the associated four sides of the current-collectors 1, 1, and a plurality of such electrolyte sealing portions 21 were resultingly and simultaneously formed to interpose the current-collectors 1 between the electrolyte sealing portions 21 in the stacking direction, respectively. This enables to completely accommodate the spacers 23 into the resin constituting the electrolyte sealing portions 21, thereby forming the sealing portions free of leakage. Without particularly limited thereto, it is of course possible to appropriately utilize various resin injecting techniques.

Packing (Completion of Battery)

The positive electrode lead and negative electrode lead are joined (electrically connected) onto and drawn out of both outermost electrodes 5a, 5b of the bipolar battery body (electrode-stacked assembly) 7, respectively. At this time, the above-mentioned positive and negative electrode terminal plates may be arranged. Preferably usable as the joining technique of the positive and negative electrode leads is ultrasonic welding or the like to be conducted at lower temperatures, without particularly limited thereto, and various joining techniques can be appropriately utilized.

The whole of the electrode-stacked assembly 7 is encapsulated in the battery armoring material or battery casing 10 so as to prevent impact from the exterior and to avoid environmental degradation, thereby completing the bipolar battery 11. At this time, the positive electrode lead 8 and negative electrode lead 9 are also encapsulated, and portions thereof are drawn out of the battery (see FIG. 3). The material of the battery armoring material (battery casing) 10 preferably includes a metal (such as aluminum, stainless steel, nickel, copper) having an inner surface coated with an electrical insulator such as polypropylene film. It is possible to provide wires having connectors for voltage measurement if necessary, and such wires can be similarly drawn out.

Second Embodiment

There will be explained hereinafter a bipolar battery and a related method according to a second embodiment of the present invention, in detail. Although the basic constitution of this embodiment is the same as the first embodiment, the spacer constitution is different. There will be thus explained hereinafter such a difference in a focused manner, by designating the same components by the same reference numerals while appropriately omitting or simplifying the explanation thereof.

FIG. 9A is a schematic side view of a spacer to be used in a bipolar battery according to this embodiment, and FIG. 9B is a schematic plan view of the spacer of FIG. 9A. FIG. 10A is a schematic plan view of an electrode-stacked assembly in such a bipolar battery arranged with the multiple spacers shown in FIG. 9A and FIG. 9B (the current-collector at the top-most layer is omitted); and FIG. 10B is a schematic side view of the electrode-stacked assembly of FIG. 10A.

As shown in FIG. 9A and FIG. 9B, each spacer 53 in this embodiment is made as a continuous body having a plurality of openings 53a, and the sizes and intervals of the openings 53a are set so that the resin precursor for the electrolyte sealing portion 21 can be sufficiently filled into the openings 53a to keep sealing property such as by immersion or injection.

Further, it is desirable that the width $W_3$ of each spacer 53 as a continuous body is set to be smaller than the width $W_1$ of the electrolyte sealing portion 21, as shown in FIG. 10A and FIG. 10B. Concerning arrangement of such a spacer 53 at the periphery of the associated current-collector 1, it is possible to prepare and arrange an integrally constituted spacer 53 fully corresponding to four sides of the current-collector 1, or to alternatively and separately prepare and arrange a pair of spacers 53, 53 for the long sides and a pair of spacers 53', 53' having the similar openings 53a and corresponding to the short sides of the current-collector as shown in the figures.

Namely, the integral spacer 53 or the separate spacers 53, 53' is/are arranged at the periphery of each bipolar electrode 5 by adhering with adhesive or by tacking with paste, upon bonding and stacking the bipolar electrodes 5 and the electrolyte layers 4 such as polymer electrolyte layers. Note, such an arranging procedure may be conducted at this stage, or the spacers may be previously arranged such as before forming the positive electrode layers 2 and negative electrode layers 3.

After arranging such an integral spacer 53 or separate spacers 53, 53' at the peripheries of the current-collectors 1, the resin is injected into gaps not only outside of the spacer(s) but also inside them via openings 53a to thereby form the electrolyte sealing portions 21, thereby obtaining the electrode-stacked assembly 7. Note, because gaps may be caused at junctures between such separate spacers 53, 53' upon adopting them, it is desirable to form the electrolyte sealing portions 21 also at such gaps by resin injection to thereby ensure the sealing property for the whole periphery of the electrode-stacked assembly 7.

Third Embodiment

There will be explained hereinafter a bipolar battery and a related method according to a third embodiment of the present invention, in detail. Although the basic constitution of this embodiment is the same as the second embodiment at the point utilizing a spacer as a continuous body, the detailed spacer constitution is different. There will be thus explained hereinafter such a difference in a focused manner, by designating the same components by the same reference numerals while appropriately omitting or simplifying the explanation thereof.

FIG. 11A is a schematic side view of a spacer to be used in a bipolar battery according to this embodiment, and FIG. 11B is a schematic plan view of the spacer of FIG. 11A. FIG. 12A is a schematic plan view of an electrode-stacked assembly in the bipolar battery arranged with a plurality of the spacers shown in FIG. 11 (the current-collector at the top-most layer is omitted), and FIG. 12B is a schematic side view of the electrode-stacked assembly of FIG. 12A.

As shown in FIG. 11A and FIG. 11B, each spacer 63 in this embodiment is made as a continuous body comprising unwoven fabric as porous member, and is set so that the resin precursor for the electrolyte sealing portion 21 can be sufficiently filled into the pores of the unwoven fabric to keep sealing property such as by immersion or injection. Namely, such a spacer 63 can be regarded as also acting as the electrolyte sealing portion 21.

Further, the spacer 63 as a porous continuous body has a width $W_3$ which resultingly becomes substantially the same as the width $W_1$ of the electrolyte sealing portion 21 as shown in FIG. 11A and FIG. 11B, because the resin is impregnated into the whole of the spacer 63. Although it is enough to set the width $W_3$ of the spacer 63 to be substantially the same as the width $W_1$ of the electrolyte sealing portion 21, it is possible to set the width $W_3$ to be smaller than the width $W_1$ of the electrolyte sealing portion 21 insofar as capable of exhibiting a spacer function. Concerning arrangement of such a spacer 63 at the periphery of the associated current-collector 1, it is possible to prepare and arrange an integrally constituted spacer 63 corresponding to four sides of the current-collector 1, or to alternatively and separately prepare and arrange a pair of spacers 63, 63 for the long sides and a pair of spacers 63', 63' having the similar openings 53a and corresponding to the short sides of the current-collector as shown in the figures.

Namely, the integral spacer 63 or the separate spacers 63, 63' is/are arranged at the periphery of each bipolar electrode 5 by adhering with adhesive or by tacking with paste, upon bonding and stacking the bipolar electrodes 5 and the electrolyte layers 4 such as polymer electrolyte layers. Note, such an arranging procedure may be conducted at this stage, or the spacers may be previously arranged such as before forming the positive electrode layers 2 and negative electrode layers 3. It is alternatively possible to simply interpose the spacer(s) 63 between adjacent bipolar electrodes 5 such as without pasting, because the resin is finally impregnated into the whole of spacer(s) 63 and the gaps therearound such that the spacer(s) 63 is/are accommodated and fixed in the electrolyte sealing portion 21 as a part thereof.

After arranging such an integral spacer 63 or separate spacers 63, 63' at the periphery of the current-collectors 1, the resin is injected into gaps not only outside of the spacer(s) but also inside them via pores of the spacer(s) to thereby form the electrolyte sealing portions 21, and the electrode-stacked assembly 7 is obtained then. Note, because gaps may be caused at junctures between such separate spacers 63, 63' upon adopting them, it is desirable to form the electrolyte sealing portions 21 also at such gaps by resin injection to thereby ensure the sealing property for the whole periphery of the electrode-stacked assembly 7.

It is now possible to constitute a battery module by connecting a plurality of the bipolar batteries of the above embodiments.

Figure 13:
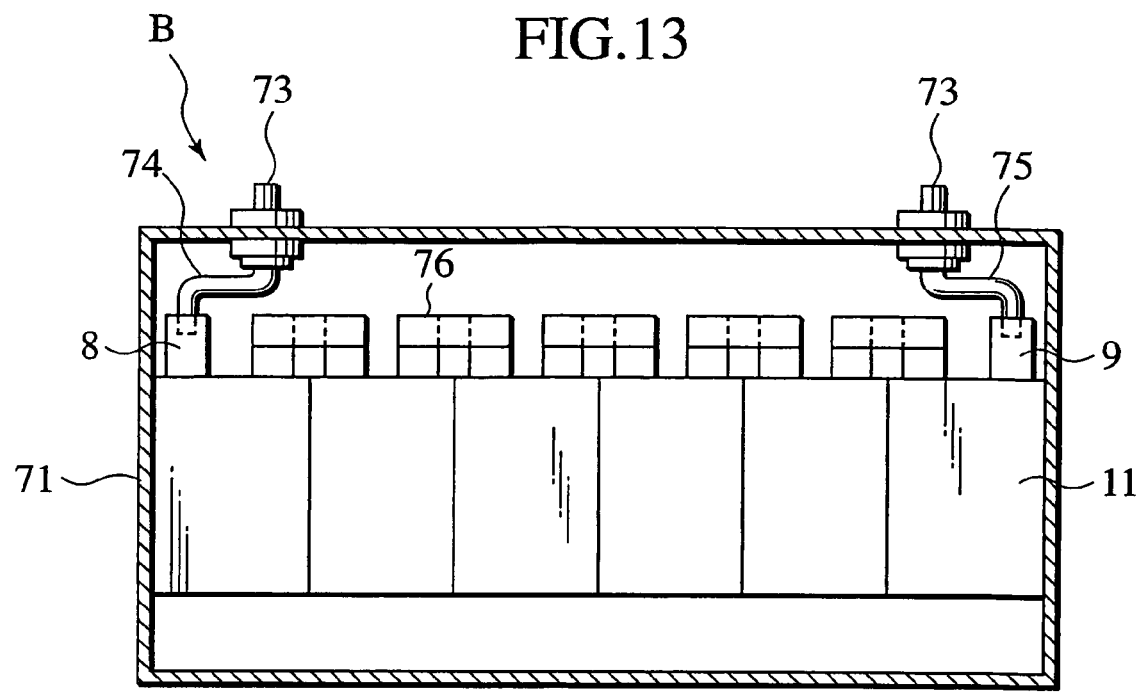
FIG. 13 is a schematic cross-sectional view of a battery module including combined multiple bipolar batteries of the embodiments of the present invention.

FIG. 13 is a schematic cross-sectional view of a battery module including combined multiple bipolar batteries of the embodiments of the present invention.

As shown in FIG. 13, at least two or more of the bipolar batteries 11 of the above embodiments are adopted and series-connected or parallel-connected to thereby constitute a battery module B, thereby enabling to relatively inexpensively deal with the demands by each purpose of use such as battery capacity and output.

Concretely, the bipolar batteries 11 of the above embodiments are constituted into the battery module B, by parallelly connecting N pieces of bipolar batteries 11 and by serially connecting M sets of these parallel-connected bipolar batteries 11, in a manner that these bipolar batteries 11 are accommodated in a battery module casing 71 made of metal or resin and connected to battery terminals 72, 73. At this time, the matrix N×M of the serial connection and parallel connection of bipolar batteries 11 is to be determined depending on the purpose of use. For example, in case of a large capacity power source such as for electric vehicle (EV) or hybrid electric vehicle (HEV), it is preferable to combine the bipolar batteries so as to be adapted to a driving power source for such a vehicle requiring a higher energy density and a higher output density. Further, the battery positive electrode terminal 72 and battery negative electrode terminal 73 for the battery module are electrically connected to the electrode leads 8, 9 of the applicable bipolar batteries 11, via lead wires 74, 75, respectively. Moreover, in serially connecting or parallelly connecting the bipolar batteries 11, these bipolar batteries are electrically connected by connection members such as spacers (not shown) or bus-bars 76.

Note, such a battery module is not limited to what is described herein, and it is possible to employ appropriate combinations. It is further possible to provide the battery module with various measuring devices, controlling devices and the like depending on the purpose of use, without particularly limited thereto, such that voltage-measuring connectors may be provided to monitor the battery voltage. It is additionally possible to appropriately combine such battery modules to thereby constitute a larger battery module (combined battery module).

Further, the above described bipolar batteries and battery modules can be installed in a vehicle, as a driving power source.

Figure 14:
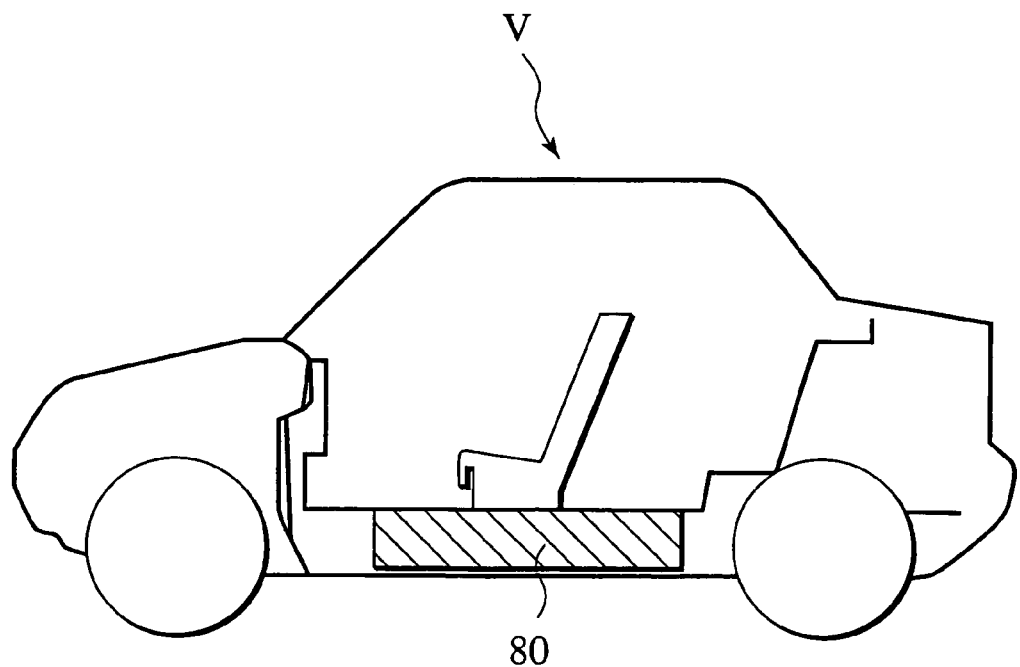
FIG. 14 is a schematic view of a vehicle applied with the battery module including the bipolar battery or combined bipolar batteries of the embodiments of the present invention.

FIG. 14 is a schematic view of a vehicle applied with the battery module including the bipolar battery or combined bipolar batteries of the embodiments of the present invention.

The bipolar batteries and battery modules of the above embodiments have excellent characteristics and particularly compact. Thus, these batteries and modules are particularly suitable as driving power sources for vehicles having severe requirements such as EVs and HEVs, thereby allowing to provide vehicles which are excellent in fuel cost, running performance and the like.

As shown in FIG. 14, it is convenient to install a battery 80 representing a battery module as a driving power source, under a seat at a central portion of a vehicle V such as EV, thereby ensuring a wider in-vehicle space and a wider trunk room. However, without limited thereto, the battery 80 may be installed under the floor, or within the trunk room, engine room, roof or bonnet hood of the vehicle, for example.

Note, it is possible to install: a bipolar battery; a battery module and a bipolar battery in an appropriately combined manner; or a composite battery module; depending on the purpose of use. Such batteries can be desirably installed as driving power sources in vehicles such as the above-mentioned EVs, without particularly limited thereto, and may be installed as auxiliary power sources in fuel-cell vehicles.

There will be explained hereinafter a representative example corresponding to the first embodiment of the present invention and a comparative example, more concretely.

EXAMPLE 1

There will be firstly explained hereinafter a representative example 1 corresponding to the first embodiment of the present invention.

Formation of Positive Electrode Layer

There was prepared a positive-electrode-aimed slurry by mixing the following components at the ratios represented in the accompanying brackets (each ratio is represented in terms of the components except for the slurry-viscosity adjusting solvent):

spinel $LiMn_2O_4$ (85 wt. %) as a positive-electrode-aimed active material, having an averaged particle size of 2 μm;

acetylene black (5 wt. %) as an electroconductive adjuvant;

PVDF (10 wt. %) as a binder; and

NMP as a slurry-viscosity adjusting solvent (an appropriate amount of NMP was added, not as a constituent material of the electrode, but as a solvent for achieving an appropriate slurry viscosity, because NMP is fully volatilized upon drying the electrode).

The positive-electrode-aimed slurry was coated onto one surface of an SUS foil (having a thickness of 20 μm) acting as the current-collector 1, and this foil was introduced into a vacuum oven and dried at 120° C. for 10 minutes, thereby forming the positive electrode layer 2 having a dry thickness of 40 μm.

Formation of Negative Electrode Layer

There was prepared a negative-electrode-aimed slurry by mixing the following components at the ratios represented in the accompanying brackets (each ratio is represented in terms of the components except for the slurry-viscosity adjusting solvent):

hard carbon (90 wt. %) as a negative-electrode-aimed active material;

PVDF (10 wt. %) as a binder; and

NMP as a slurry-viscosity adjusting solvent (an appropriate amount of NMP was added, not as a constituent material of the electrode, but as a solvent for achieving an appropriate slurry viscosity).

The negative-electrode-aimed slurry was coated onto the other side of the SUS-foil-made current-collector 1 formed with the positive electrode layer 2, and this foil was introduced into the vacuum oven and dried at 120° C. for 10 minutes, thereby forming the negative electrode layer having a dry thickness of 40 μm.

In this way, the positive electrode layer 2 and negative electrode layer 3 were formed on both surfaces of the SUS foil acting as the current-collector 1, respectively, thereby forming the bipolar electrode 5 (see FIG. 1).

Formation of Gel Electrolyte Layer

There was used a PP-made unwoven fabric (porosity: 60%) having a thickness of 50 μm, as a separator.

Such a separator was impregnated with a pre-gel solution comprising:

a copolymer, as a host polymer (10 wt. %), of polyethylene oxide and polypropylene oxide (the copolymerization ratio was 5:1, and the weight-average molecular weight was 8,000);

a solution (90 wt. %) obtained by dissolving a lithium salt $LiBF_4$ of 10 M in an electrolytic solution EC+DMC (1:3 (volume ratio)); and AlBN (0.1 wt. % relative to the host polymer) as a polymerization initiator; and the impregnated pre-gel solution was thermally polymerized at 90° C. for 1 hour in an inert atmosphere, thereby forming the gel electrolyte layer 4 comprising the unwoven fabric separator holding the gel electrolyte therein. The thickness of the thus obtained gel electrolyte layer 4 was 50 μm, which is not thicker than the unwoven fabric separator itself.

Formation of Bipolar Battery

The bipolar electrodes 5 and electrolyte layers 4 were stacked in a constitution that each electrolyte layer 4 is interposed between the associated positive electrode layer 2 and negative electrode layer 3.

Upon stacking, five layers (equal to five-fold unit cell layers) were stacked, while arranging PP-made spacers in round-columnar shapes (of 5 mm diameter) each having a thickness (i.e., height) of 100 μm at 12 locations with appropriate intervals along the periphery of the bipolar electrode 5 (the width $W_1$ of the periphery was 8 mm) as shown in FIG. 5A and FIG. 5B. The spacers were tacked by paste.

Formation of Sealing Portion

Four sides of the outer periphery of the gel electrolyte layers 4 were sequentially immersed into an epoxy resin as the sealing-portion-aimed resin, and the epoxy resin was thereafter cured to thereby form the electrolyte sealing portions 21 at a width of 10 mm from the outer peripheries (see FIG. 7B).

Further, the electrode-stacked assembly 7 formed with the electrolyte sealing portions 21 was encapsulated by the battery armoring material 10 made of laminate pack (comprising aluminum laminated with polypropylene film), thereby forming the bipolar battery 11.

COMPARATIVE EXAMPLE 1

As a comparative example 1, there was formed a bipolar battery, by exemplarily stacking five layers of bipolar electrodes in the same manner as the example 1 except that electrolyte sealing portions and spacers were omitted, and by encapsulating the thus obtained electrode-stacked assembly 7 in a battery armoring material made of laminate pack to thereby form a bipolar battery.

Evaluation

In the example 1, there were manufactured ten samples of bipolar batteries 11, exhibiting no occurrence of defective batteries such as due to short-circuit to be caused by contact between terminals during manufacturing process.

Further, there was conducted a discharge/charge cycle test for each bipolar battery 11 according to the example 1, for confirmation. The discharge/charge cycle test was conducted at 25° C., and the discharge/charge electric-current value was set at 0.5 CA. It was confirmed for each bipolar battery 11 of the example 1, that the voltages of the unit cell layers were kept even after exceeding 50 cycles, and that no short-circuit was caused such as due to contact between terminals.

Contrary, ten samples of batteries were manufactured for the comparative example 1 having no spacers, and it was confirmed during the manufacturing process that all of the ten batteries were accompanied by occurrence of: short-circuit due to contact between current-collecting foils; or a liquid junction phenomenon in which the electrolytic solutions were leaked and mutually contacted.

Summarizing the above, the bipolar battery according to the present invention has a constitution that: the multiple bipolar electrodes comprising current-collectors formed with positive electrode layers and negative electrode layers at one and the other sides of the current-collectors, respectively, are stacked and series-connected, while interposing the electrolyte layers between two adjacent bipolar electrodes, respectively; and the spacers for holding gaps between the bipolar electrodes are provided in the electrolyte sealing portions formed at the peripheral portions of the bipolar electrodes, respectively.

Further, the manufacturing method of a bipolar battery according to the present invention is constituted to comprise: arranging spacers at peripheral portions of bipolar electrodes, upon stacking the bipolar electrodes; and forming the electrolyte sealing portions at such peripheral portions, respectively, by injecting a resin into gaps between such peripheral portions.

Such a constitution allows to prevent contact between current-collectors, thereby readily and assuredly forming the electrolyte sealing portions. This particularly allows to expediently and effectively prevent leakage of electrolytic solution such as from a solution-based electrolyte and a polymeric gel electrolyte.

This enables to prevent liquid junction between unit cell layers, thereby allowing to provide a small-sized bipolar battery which has an excellent ionic conductivity and superior battery properties such as discharge/charge characteristics. Such a bipolar battery has a higher reliability and is capable of keeping higher energy density and higher output density, thereby acting as a useful electric-power source in various industries. This is also true even in a bipolar battery adopting a polymer solid electrolyte, because contact between foils can be prevented upon forming the electrolyte sealing portions.

Although the invention has been described above by reference to certain embodiments of the invention, the invention is not limited to the embodiments described above. Modifications and variations of the embodiments described above will occur to those skilled in the art, in light of the teachings. The scope of the invention is defined with reference to the following claims.

What is claimed is:

1. A bipolar battery comprising:
a plurality of bipolar electrodes;
each of the plurality of bipolar electrodes being provided with:
a current-collector;
a positive electrode layer formed on one side of the current-collector; and
a negative electrode layer formed on the other surface of the current-collector;
electrolyte layers formed between adjacent ones of the plurality of bipolar electrodes, respectively, so that the plurality of bipolar electrodes are stacked in a stacking direction by interposing the electrolyte layers between adjacent ones of the plurality of bipolar electrodes, respectively;
sealing portions surrounding and sealing the electrolyte layers, respectively; and
contributing members contributing to keeping gaps between the adjacent ones of the plurality of bipolar electrodes, the bipolar battery being a lithium-ion secondary battery and the contributing members being disposed within areas of the sealing portions to be discrete spacers or continuous spacers having heights in the stacking direction so as to spread between adjacent ones of the plurality of bipolar electrodes, respectively.

2. The bipolar battery according to claim 1, wherein the sealing portions are located to surround those peripheries of the contributing members along a direction perpendicular to the stacking direction, respectively.

3. The bipolar battery according to claim 2, wherein the contributing members are disposed to spread between the adjacent ones of the plurality of bipolar electrodes, respectively, and the sealing portions are disposed to fill the gaps between the adjacent ones of the plurality of bipolar electrodes so as to encapsulate the contributing members within the sealing portions, respectively.

4. The bipolar battery according to claim 1, wherein the widths of the spacers in directions perpendicular to the stacking direction are narrower than the widths of the sealing portions in the directions perpendicular to the stacking direction, respectively.

5. The bipolar battery according to claim 1, wherein the spacers have openings penetrating through the spacers in directions perpendicular to the stacking direction, respectively.

6. The bipolar battery according to claim 5, wherein the sealing portions are made of resins which surround the spacers while penetrating through the openings of the spacers, respectively.

7. The bipolar battery according to claim 5, wherein the widths of the spacers in directions perpendicular to the stacking direction are narrower than the widths of the sealing portions in the directions perpendicular to the stacking direction, respectively.

8. The bipolar battery according to claim 1, wherein the spacers are made of porous material.

9. The bipolar battery according to claim 8, wherein the porous material is an unwoven fabric.

10. The bipolar battery according to claim 8, wherein the widths of the spacers in directions perpendicular to the stacking direction are the same as the widths of the sealing portions in the directions perpendicular to the stacking direction, respectively.

11. The bipolar battery according to claim 1, wherein the positive electrode layer comprises a positive active material including lithium-transition metal complex oxide, and the negative electrode layer comprises a negative active material including carbon or including lithium-transition metal complex oxide.

12. The bipolar battery according to claim 1, wherein the electrolyte layers include separators impregnated with electrolytic solution, respectively.

13. The bipolar battery according to claim 1, wherein the electrolyte layers include polymer gel electrolyte, respectively.

14. The bipolar battery according to claim 1, wherein the electrolyte layers include polymer solid electrolyte, respectively.

15. A bipolar battery comprising:
a plurality of bipolar electrodes;
each of the plurality of bipolar electrodes being provided with:
a current-collector;
a positive electrode layer formed on one side of the current-collector; and
a negative electrode layer formed on the other surface of the current-collector;
electrolyte layers formed between adjacent ones of the plurality of bipolar electrodes, respectively, so that the plurality of bipolar electrodes are stacked in a stacking direction by interposing the electrolyte layers between adjacent ones of the plurality of bipolar electrodes, respectively;
sealing means for surrounding and sealing the electrolyte layers; and
contributing means for contributing to keeping gaps between the adjacent ones of the plurality of bipolar electrodes, the bipolar battery being a lithium-ion secondary battery and the contributing means being provided in an area of the sealing means to be discrete spacers or continuous spacers having heights in the stacking direction so as to spread between the adjacent ones of the plurality of bipolar electrodes, respectively.

16. A manufacturing method of a bipolar battery, comprising:
preparing a plurality of bipolar electrodes,
each of the plurality of bipolar electrodes being provided with:
a current-collector;
a positive electrode layer formed on one side of the current-collector; and
a negative electrode layer formed on the other surface of the current-collector;
providing electrolyte layers between adjacent ones of the plurality of bipolar electrodes, respectively;
providing contributing members contributing to keeping gaps between the adjacent ones of the plurality of bipolar electrodes, respectively;
stacking the plurality of bipolar electrodes in a stacking direction by interposing the electrolyte layers between adjacent ones of the plurality of bipolar electrodes, respectively; and
forming sealing portions surrounding and sealing the electrolyte layers, respectively, the bipolar battery being a lithium-ion secondary battery and the contributing members being disposed within areas of the sealing portions to be discrete spacers or continuous spacers having heights in the stacking direction so as to spread between adjacent ones of the plurality of bipolar electrodes, respectively.

* * * * *